Figure 1E:
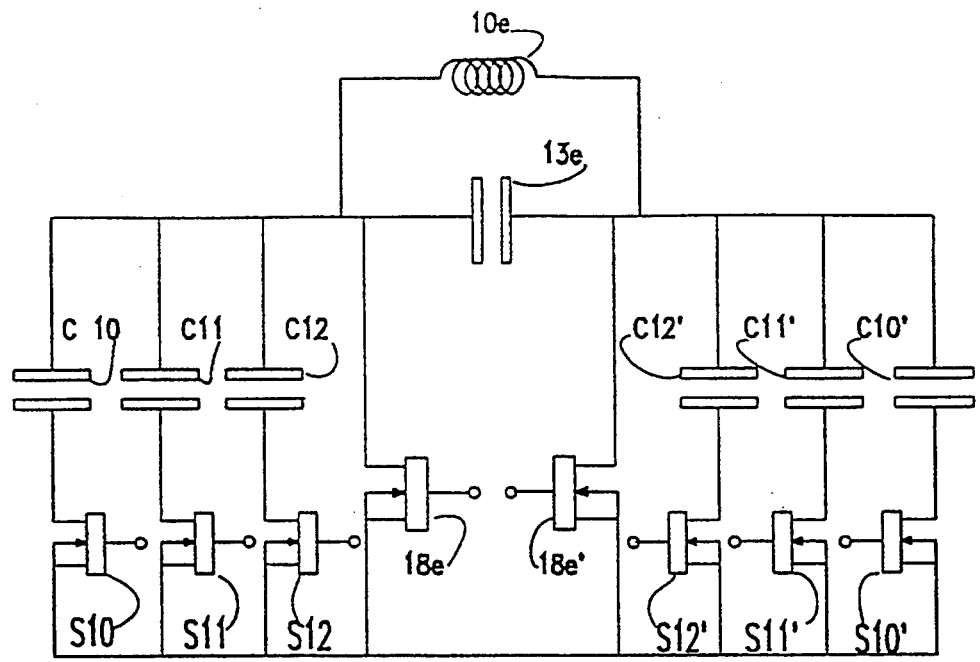

United States Patent [19]

Boys et al.

[11] Patent Number: 5,450,305
[45] Date of Patent: Sep. 12, 1995

[54] RESONANT POWER SUPPLIES

[75] Inventors: John T. Boys, Birkdale; Andrew W. Green, Papatoetoe; both of New Zealand

[73] Assignee: Auckland Uniservices Limited, Auckland, New Zealand

[21] Appl. No.: 926,051

[22] Filed: Aug. 5, 1992

[30] Foreign Application Priority Data

Aug. 12, 1991 [NZ] New Zealand ............ 239366
Aug. 23, 1991 [NZ] New Zealand ............ 239533

[51] Int. Cl.[6] .......................................... H02M 3/335
[52] U.S. Cl. .................................. 363/24; 363/97; 363/133; 219/624; 219/664
[58] Field of Search .................. 363/24, 25, 55, 56, 363/95, 96, 97, 133, 134, 135; 219/624, 664, 665

[56] References Cited

U.S. PATENT DOCUMENTS

| | | | |
|---|---|---|---|
| 3,775,577 | 11/1973 | Peters, Jr. ............. | 219/10.49 |
| 3,887,781 | 6/1975 | Peters, Jr. ............. | 219/10.49 |
| 4,035,745 | 7/1977 | Doetsch ................ | 331/114 |
| 4,364,045 | 12/1982 | Spiegel ................ | 340/870.31 |
| 4,426,564 | 1/1984 | Steigerwald et al. ...... | 219/10.77 |
| 4,574,342 | 3/1986 | Runyan ................ | 363/134 |
| 4,595,814 | 6/1986 | Ogino et al. .......... | 219/10.77 |
| 5,121,314 | 6/1992 | Cathell et al. ......... | 363/17 |
| 5,293,308 | 3/1994 | Boys et al. ........... | 363/37 |

FOREIGN PATENT DOCUMENTS 844219 11/1976 Belgium.

OTHER PUBLICATIONS

Kassakian, et al., Principles of Power Electronics, 1991.

*Primary Examiner*—Steven L. Stephan
*Assistant Examiner*—Adolf Berhane
*Attorney, Agent, or Firm*—Juettner Pyle Lloyd & Piontek

[57] ABSTRACT

This resonant power supply produces a varying magnetic field from a resonant inductor. Two active switches drive, but remain outside, a resonant circuit, also including resonant capacitor. A phase-splitting transformer provides, via a decoupling inductor, one connection for a power supply; the return is through the active switches, which are either off or are from time to time driven alternately by the controller so as to maintain the resonant current in the resonant circuit. Applications include induction heating and induction hobs for cooking, and also a power source for inductively powered vehicles (or other inductively powered devices) adjacent to an inductive pathway.

9 Claims, 17 Drawing Sheets

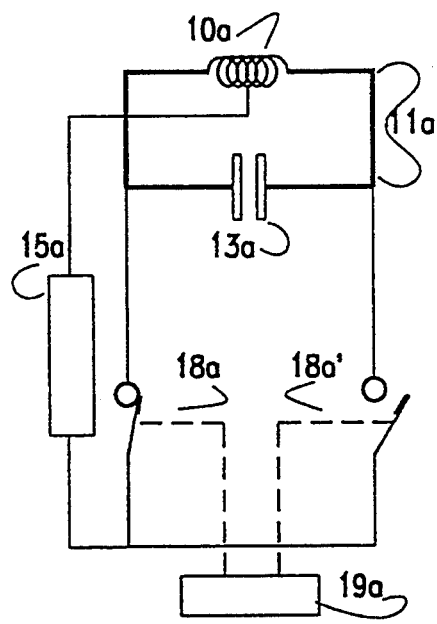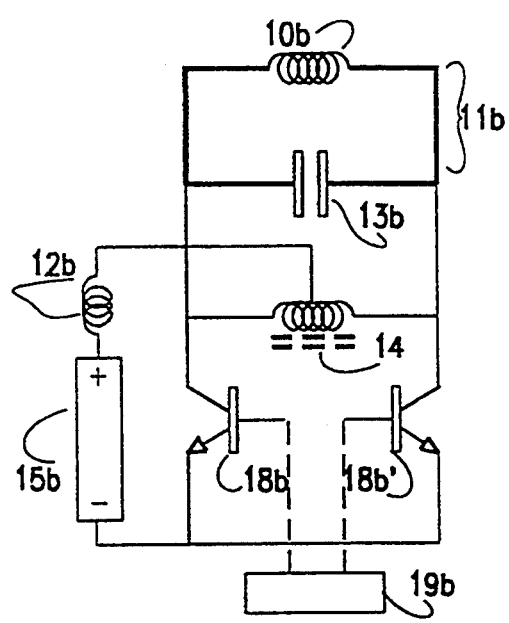
*Figure 1a*     *Figure 1b*
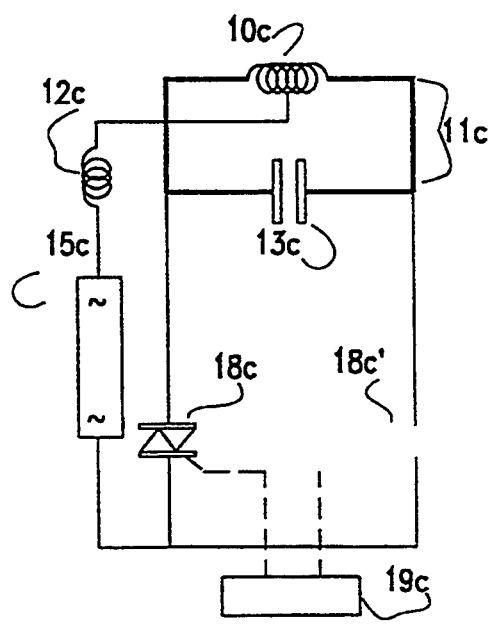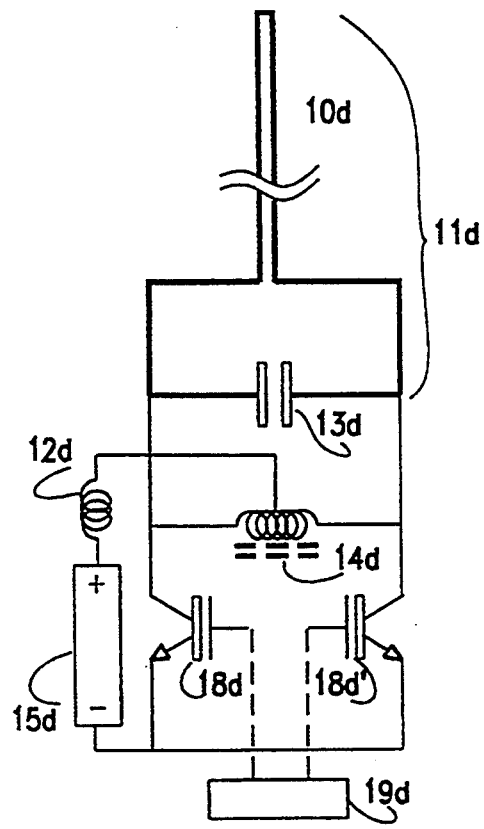
*Figure 1c*     *Figure 1d*

RESONANT POWER SUPPLIES

FIELD OF THE INVENTION

This invention relates to a resonant electrical energy converter or power supply and applications for it.

The converter has particular application to the provision of electric power for induction heating purposes and the like, and also for the inductive transfer of power across a space. Here the power may become the motive power for mobile vehicles, or power for energisation purposes such as electronic devices or lighting; or power for use in energising fluorescent lamps, for ultrasonic generators, or for applications requiring minimal transformer mass, such as in aerospace applications, in compact switched-mode power supply applications, and the like.

BACKGROUND

The principles of induction heating are well-known; where the inductive process generates eddy currents within conducting material. For example it is used in cooking, a primary coil emitting a changing magnetic flux that induces heat within the substance of conducting food containers to provide a clean, safe, contained and controllable heat. Existing power supplies tend to radiate untoward levels of spurious frequencies while working and require rather specialised power semiconductor devices. They are insufficiently cheap and economical for widespread use as in domestic cooking, although any technique that applies heat so specifically to the cooking vessel should be more desirable and efficient than, for example, a flame. Inductive heating is also used in manufacture, as in zone refining, or the case hardening of gear teeth.

The principles of inductive transfer of electricity for supplying motive power along a defined route or track are also well known but development of this field has been hampered by the difficulty of generating and distributing alternating current electricity of a suitable power and frequency.

Inductive transfer has often been proposed for situations wherein conventional cables and connectors are unsuitable; perhaps for reasons of explosion hazards caused by sparks in operating theatres, or water with attendant shock hazards in underwater applications (like swimming pools), or other sites where the tangle of a multiplicity of power leads is undesirable.

PRIOR ART

Resonant power supplies which are application-specific for induction cookers are typified by Steigerwald U.S. Pat. No. 4,426,564 (Jan 17, 1984), who teaches a parallel-resonant induction cooking unit, Peters Jr, U.S. Pat. No. 3,887,781 (Jun. 3, 1975), who teaches a thyristor-driven cooker (in which the thyristor carries resonating currents), and Ogino et al U.S. Pat No. 4,595,814, (Jun. 17, 1986) who teach a single switched device that carries the resonating currents. Runyon U.S. Pat. No. 4,574,342 (Mar. 4th 1986) describes a low-power sinusoidal oscillator suitable for electroluminescent displays.

OBJECT

It is an object of the present invention to provide an improved resonant power supply, or one which will at least provide the public with a useful choice.

STATEMENT OF THE INVENTION

In its most general aspect the invention provides a resonant power supply involving the maintenance of resonant currents which are caused to flow in a first inductor and a capacitor wired in parallel, thereby generating alternating power of low harmonic content. Of course, the inductor and capacitor may be composed of one or more discrete physical manifestations.

In one aspect the invention provides a resonant power supply suitable for generating a periodically varying magnetic field comprising:
- a three-terminal resonant inductive unit, the intermediate terminal of which is connected to a first terminal of a power source, and
- a two-terminal resonant capacitative unit; each terminal of which is connected to a corresponding outer terminal of said inductive unit, thereby comprising an electrically resonant circuit having an operating frequency at or close to its natural resonant frequency,
- a pair of controllable switching devices, each capable of adopting a closed state or an open state, each switching device being connected between a corresponding terminal of the resonant circuit and a second terminal of the power source, and
- controlling means coupled to each of the switching devices and capable of causing each switching device to open and close alternately and in opposite phase to the state of the other switching device at a rate corresponding to the operating frequency of the resonant circuit, whereby in use the resonating current is reinforced by operation of the switching devices and the resonating current does not pass through the switching devices, and the magnetic field is emitted from the inductive unit.

In a more preferred aspect the invention provides a resonant power supply suitable for generating a periodically varying magnetic field, comprising:
- a first two-terminal resonant inductive unit, and
- a two-terminal resonant capacitative unit; each terminal of which is connected to a corresponding terminal of said first inductive unit, thereby comprising an electrically resonant circuit having an operating frequency at or close to its natural resonant frequency,
- a second, three-terminal inductive unit having two outer terminals and a centre-tapped terminal, presenting a relatively high reactance at the operating frequency so that in use substantially none of the resonating current flows through it, each outer terminal being connected to a corresponding terminal of the resonant circuit, while the centre tapped terminal is connected to one terminal of a power source,
- a pair of controllable switching devices, each capable of a closed state or an open state, each switching device being connected between a corresponding terminal of the resonant circuit and a second terminal of the power source, and
- controlling means coupled to each of the switching devices and capable of causing each switching device to open and close alternately and in opposite phase to the state of the other switching device at a rate corresponding to the operating frequency of the resonant circuit, whereby in use the resonating current is reinforced by operation of the switching devices and the resonating current does not pass through the switching devices, and the magnetic field is emitted from the first two terminal inductive unit.

In more detail, the invention as in the above aspect provides an electrical energy converter or power supply using a resonant centre-tapped first inductor and a capacitor wired in parallel for generation of alternating electric power of low harmonic content, within and available from the resonant loop, from a substantially constant current direct-current supply. The supply current is preferably fed in through a two-terminal decoupling inductive unit (to provide substantially constant current) to the centre tap of the resonant first inductor or otherwise a second inductor having a centre tap and a relatively high impedance to the operating frequency may be used as the power feed; whereupon the first inductor becomes a two-terminal device and may even comprise an external, distributed line. The supply current feed is taken alternately out of each end of the inductor, through either of two switch devices controlled with complementary commands, to the return path for the supply current feed.

Distinguishing features of this invention include the restriction of the high circulating resonant currents to the inductor capacitor loop; the circulating currents do not traverse the controlled switches. Nor do they traverse the second, centre-tapped inductor. The switch devices and the second inductor carry supplied current only.

Preferably the supply power is steady or even intermittent direct current, such as that obtained from a half-wave or full-wave rectifier without smoothing.

Optionally the supply power may be alternating current, when the switch devices should be of a type capable of blocking voltages of the levels present at either polarity, including the withstanding of reverse voltages, and capable of operating at the desired switching speed.

Preferably the operating frequency falls in the range from 450 Hz to 1 MHz. More preferably the operating frequency lies within the range of from 1 to 100 KHz. The operating frequency will be decided on the basis of a number of factors relating to requirements and available technology; in the case of induction heating we have chosen an example operating at approximately 25 KHz, whilst for the resonant power supply for distributing power to moving vehicles we have chosen to use an operating frequency of approximately 10 KHz.

In a subsidiary aspect the invention incorporates the above converter of electrical energy within a discrete inductive heating unit, from which unit energy in the form of rapidly yet steadily changing magnetic flux is emitted at defined sites. In this aspect the invention is suitable for use as an inductive heating device or cooking hob, wherein the heating effect of at least the induced secondary currents or eddy currents within a conductive container causes the food or other materials within to be heated.

Optionally more than one inductive heating unit may be placed within a single enclosure.

In a related aspect the invention is supplied with intermittent, rectified DC obtained by rectification of the incoming mains supply, yet does not require a continuous flow of DC; this permits the provision of an input power factor of close to 1.

In a second subsidiary aspect the invention provides an electricity to magnetic flux converter, in which the incoming electrical energy is convened into alternating current as described in preceding statements and is distributed about a defined area or along tracks or routes as electricity by means of conductors carrying resonant currents. Devices are adapted to consume power from this distribution network collect it by inductive transfer means from magnetic flux radiated from the conductors, reaching across an intervening space to a secondary inductor.

In an aspect related to the above, wherein it is common to provide resonant secondaries as well, an optional method for electrically and either manually or automatically tuning the frequency of resonance is provided preferably using pairs of capacitors with switches, as applications are envisaged wherein the supply frequency ought to be substantially fixed.

In a third subsidiary aspect the invention provides an electrical energy converter or power supply of the AC/AC type, or AC/DC with a final rectifying stage, using a resonant inductor and capacitor wired in parallel for generation of alternating electric power of low harmonic content having a frequency in the range as above from an alternating current supply having a generally low (typically 50, 60 or 400 Hz) frequency. The higher frequencies obtainable with a converter allow the use of less transformer core material.

Preferably the converter is equipped with at least one ancillary power module to (a) rectify the incoming mains and raise the voltage to a high direct voltage on an internal bus, thus allowing the device to present a power factor of close to 1 to the incoming mains supply, (b) provide current and fault protection, and (c) to reduce the high voltage direct current to a lower voltage for conversion back to AC.

In a fourth subsidiary aspect the invention provides an electrical energy converter or power supply using a resonant inductor and capacitor wired in parallel for generation of electric power of low harmonic content from an alternating current supply, with intermediate stages to rectify, smooth, and/or raise or lower the voltage of the direct current supplied to the resonant section.

In a related aspect the invention provides an electrical energy converter or power supply using a resonant inductor and capacitor wired in parallel for generation of alternating electric power of low harmonic content from an alternating current supply, with intermediate stages that provide an input power factor substantially equal to 1.

In a fifth subsidiary aspect the invention provides an electrical energy converter suitable for generating low-voltage, high-current AC suitable for inductively coupling power from fixed conductors to moving vehicles, such as storage trolleys moving along tracks or rails.

In another aspect the invention provides an electrical energy converter suitable for generating power optimised for electric lighting; such as for energising fluorescent lamps.

In another aspect the invention provides an electrical energy converter suitable for generating power optimised for ultrasonic transducers, such as are used for cleaning purposes.

In another aspect the invention provides a type of switched-mode power supply in which the use of a magnetic flux having a constant rate of change confers advantages over types that use a pulsed change of flux.

DRAWINGS

The following is a description of a preferred form of the invention, given by way of example only, with reference to the accompanying diagrams.

FIGS. 1a, 1b, 1c, and 1d: are simplified diagrams of versions of this power supply, comprising a resonant power supply having a changing magnetic field as its output.

Figure 1F:
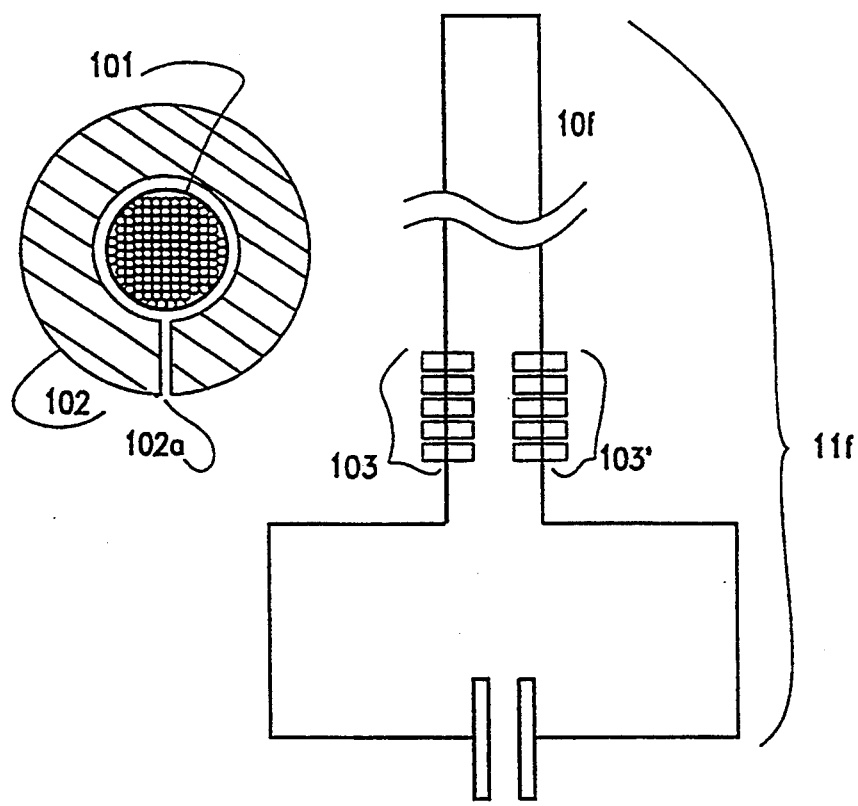

FIGS. 1e and 1f: show capacitative and inductive means, respectively, for trimming the resonant frequency of the circuit.

Figure 2:
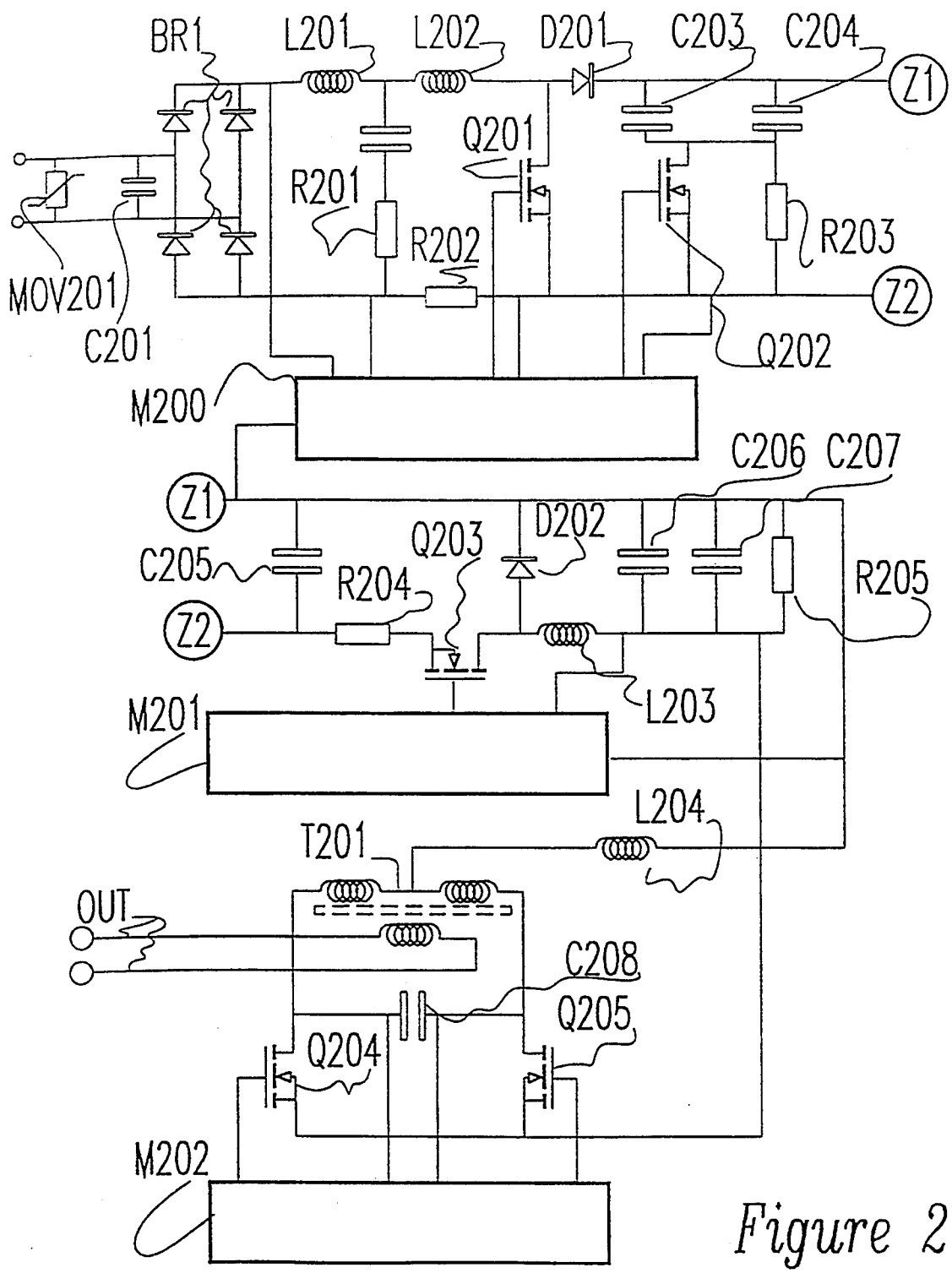

FIG. 2: is an illustration of a second version of this power supply, configured for use as a rail energiser for an inductively coupled railway track. (Embodiment 2)

Figure 3:
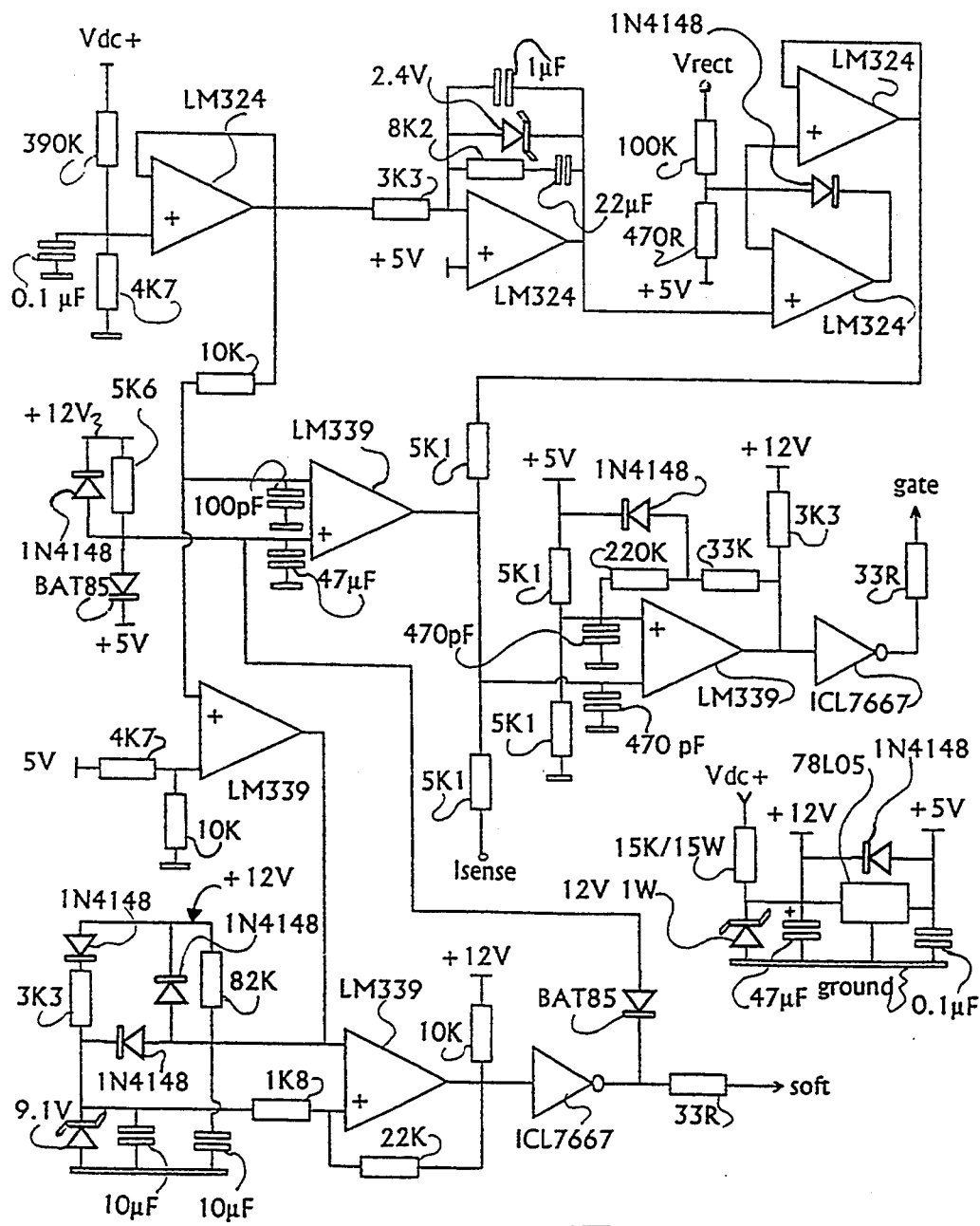

FIG. 3: is an illustration showing details of the "boost controller" of FIG. 2. (Embodiment 2)

Figure 4:
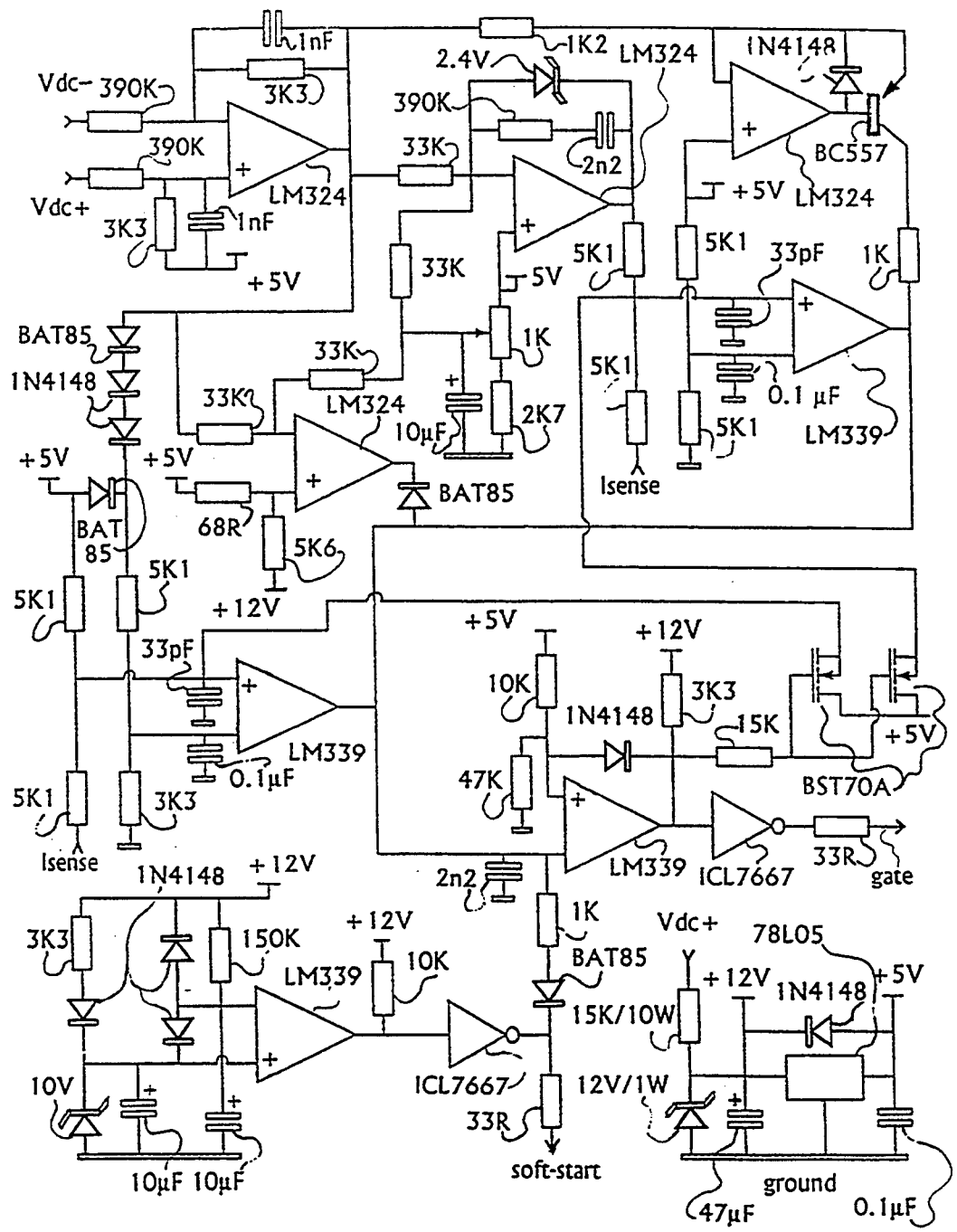

FIG. 4: is an illustration showing details of the "buck controller" of FIG. 2. (Embodiment 2)

Figure 5:
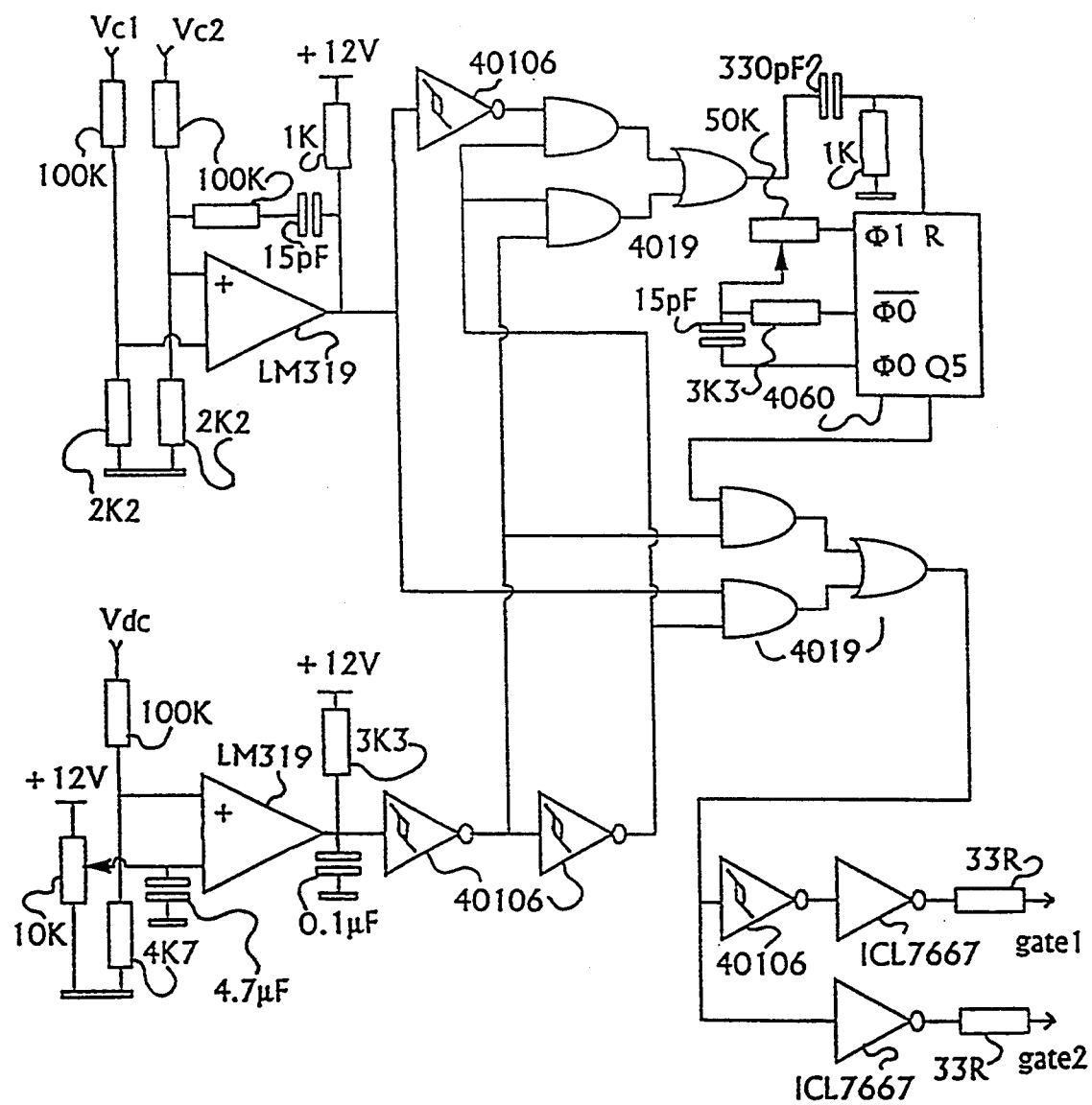

FIG. 5: is an illustration showing details of the resonant converter controller of FIGS. 1 and 2. (Embodiment 2)

Figure 6:
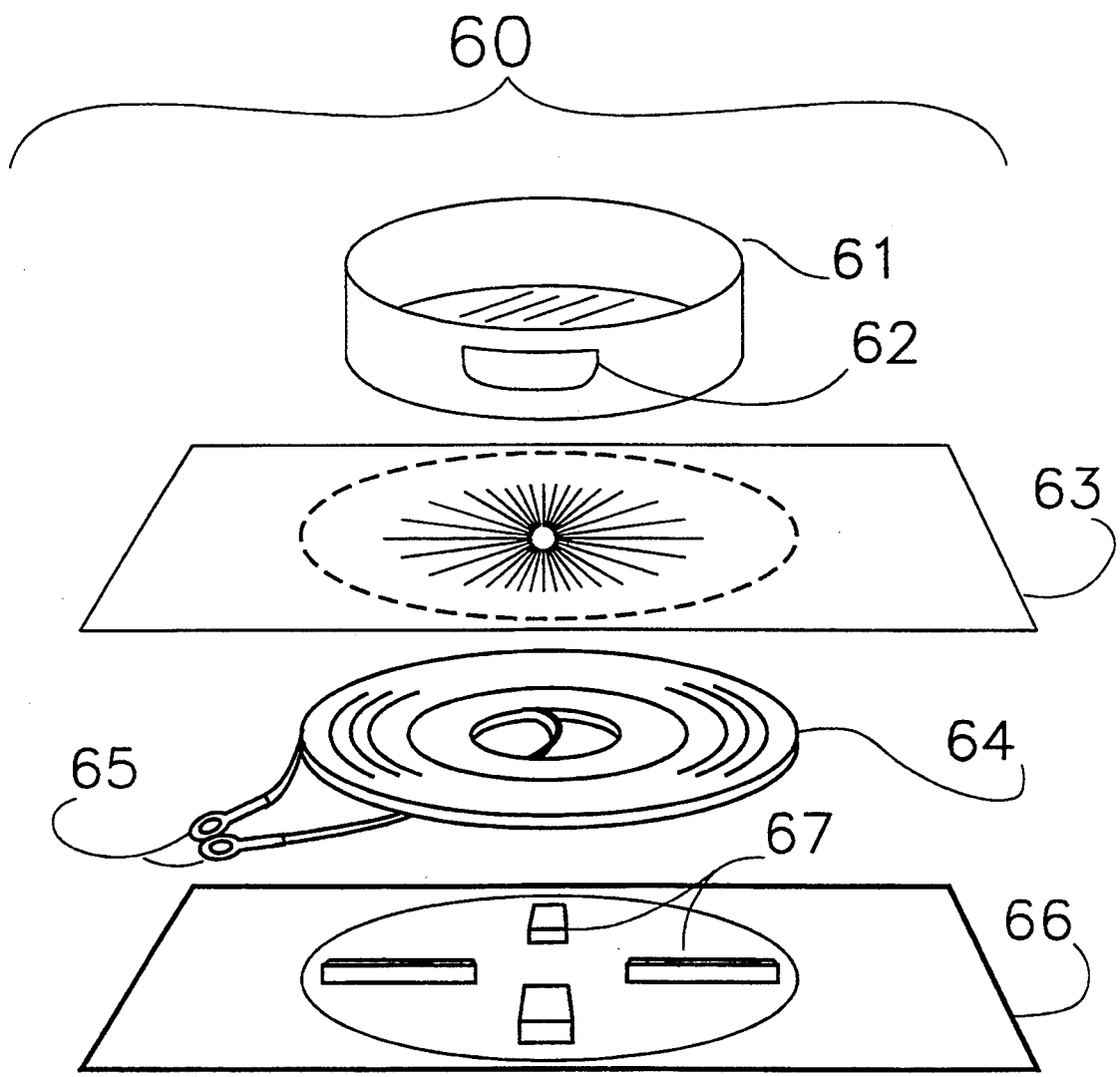

FIG. 6: is an illustration showing the construction of an inductively powered cooking plate or hob. (Embodiment 1)

Figure 7:
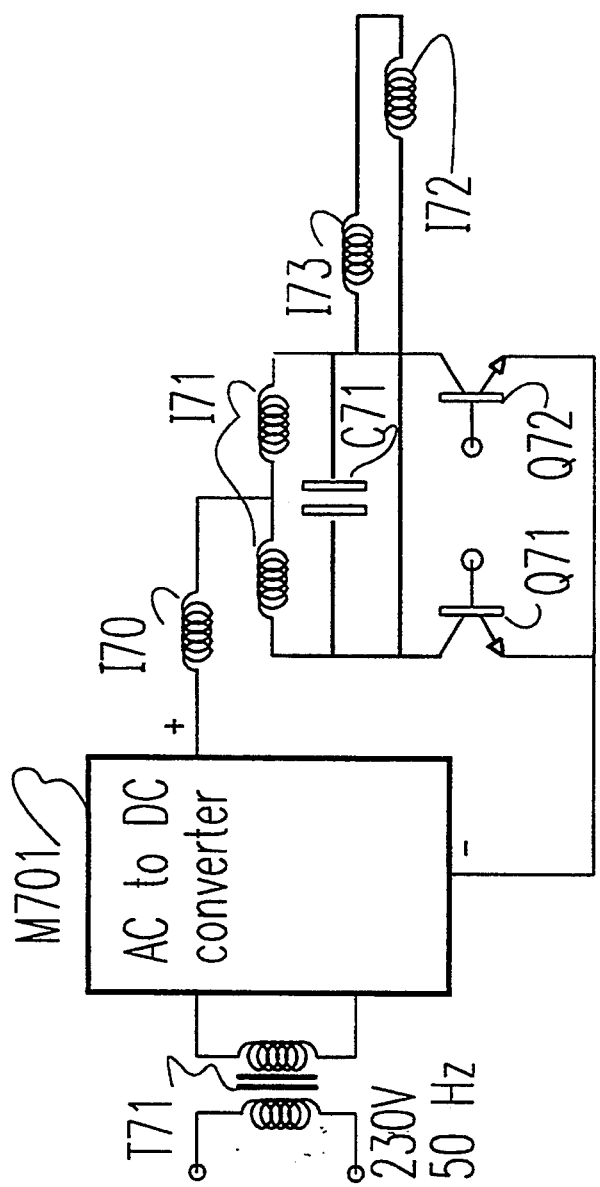

FIG. 7: is an illustration showing the arrangement for using the resonant power converter with a long inductively coupled track having significant inductance. (Embodiment 4)

Figure 8:
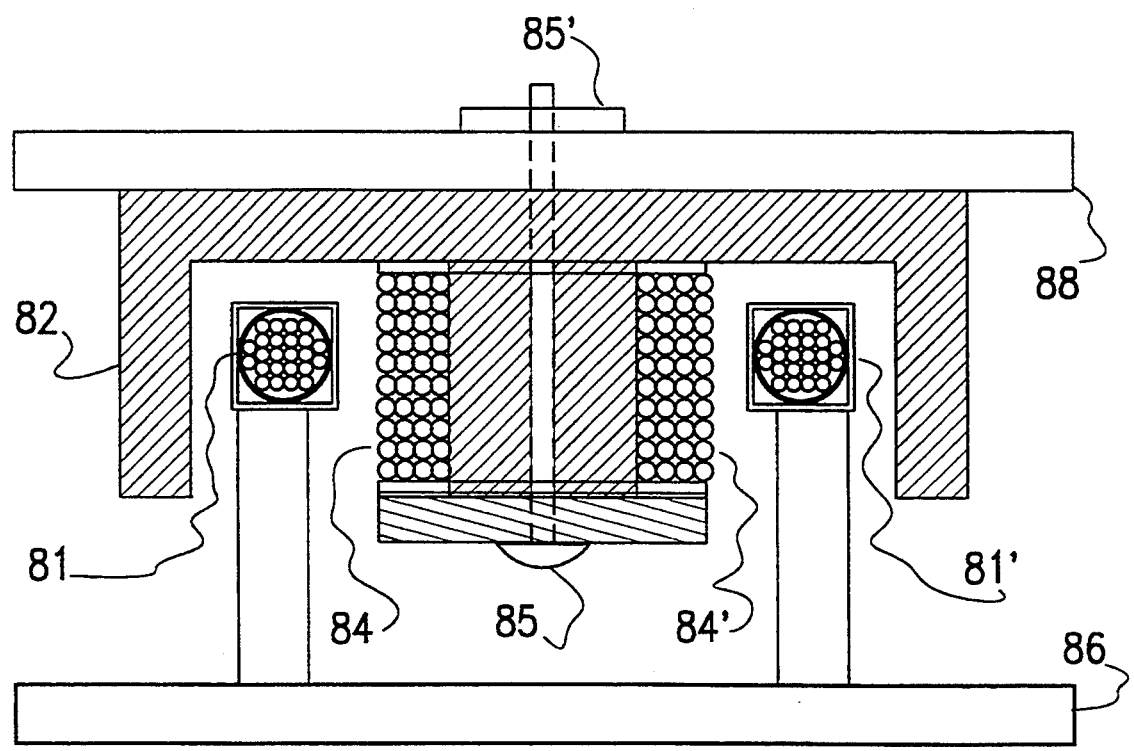

FIG. 8: is an illustration showing the arrangement of the ferrite core for the secondary windings of embodiment in the previous figure.

Figure 9A:
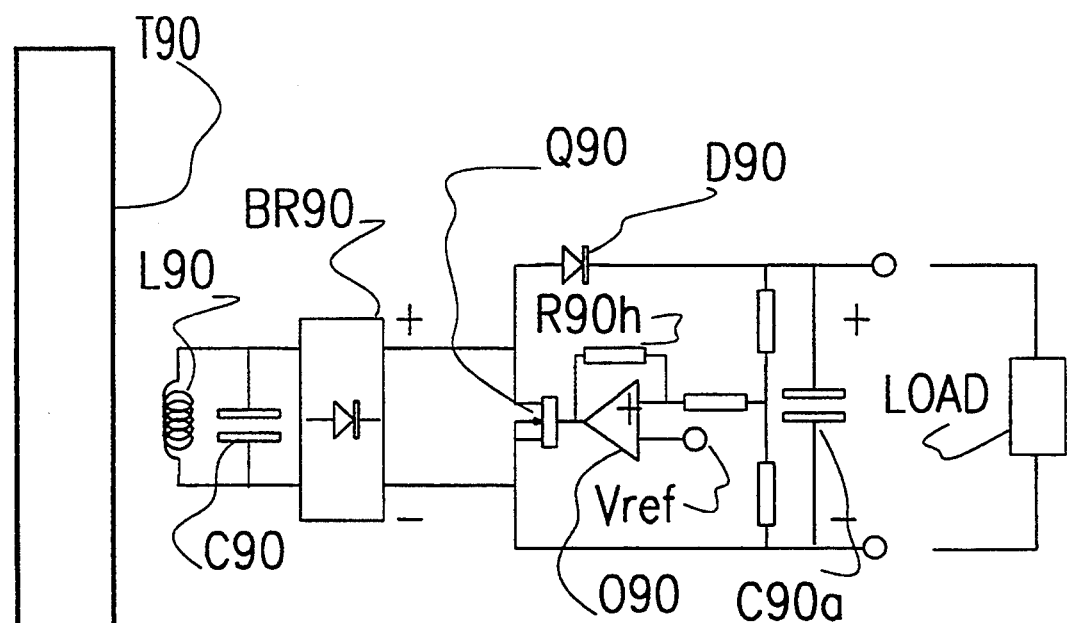
Figure 9B:
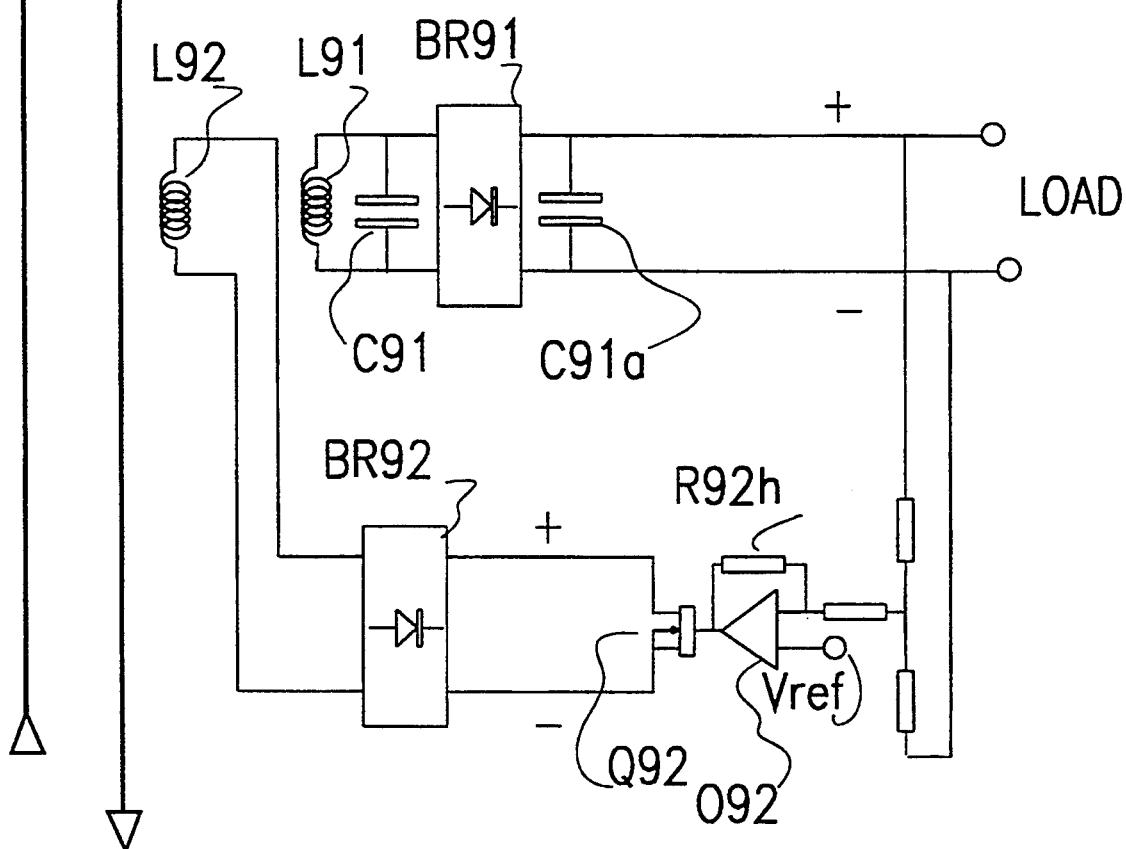

FIG. 9a and 9b: are illustrations showing two methods for decoupling a secondary coil in the event of too high an output being detected. (Embodiment 4)

Figure 10:
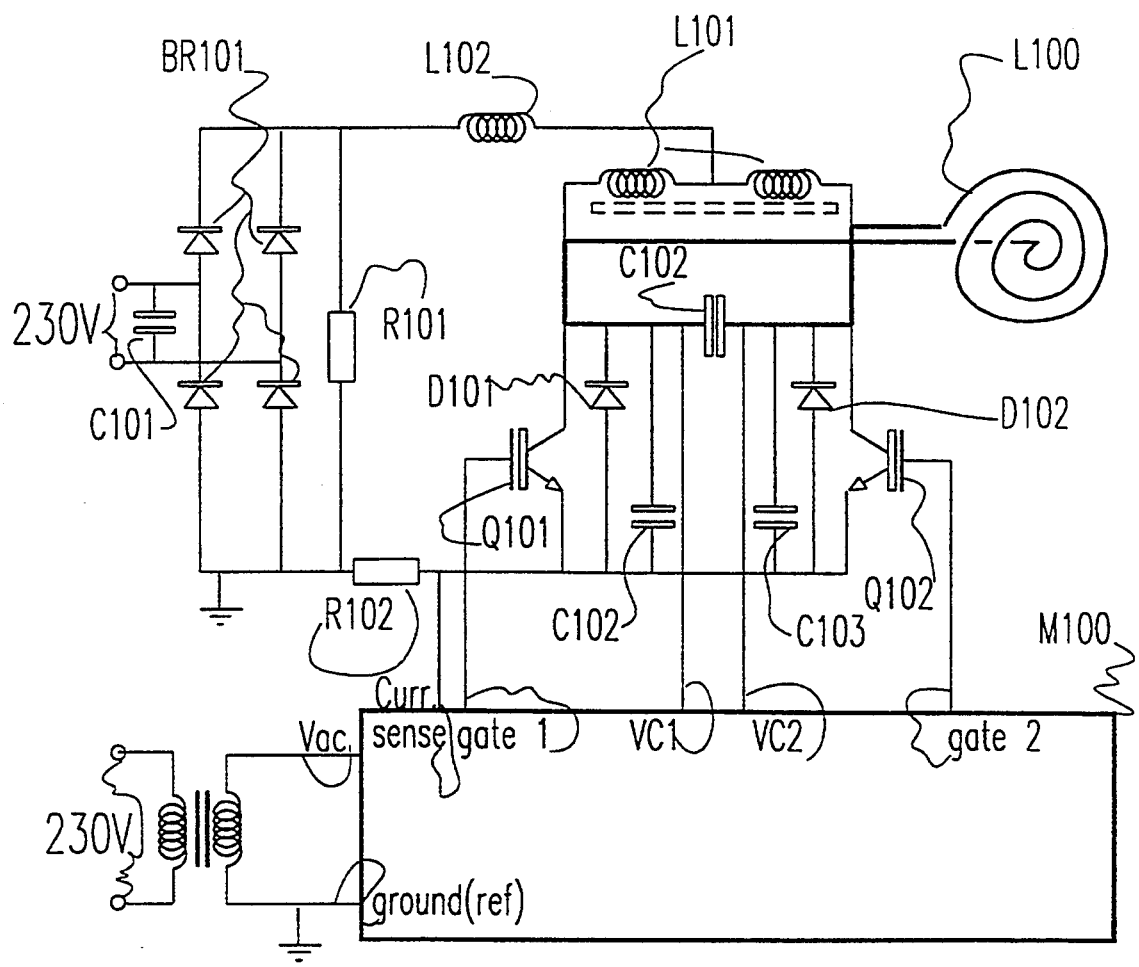

FIG. 10: is an illustration of a further preferred embodiment of the cooking plate or hob, apart from the controller circuit.

FIGS. 11 and 11a to 11e: is a set of illustrations showing the circuit for the controller for the cooking plate or hob.

PREFERRED EMBODIMENTS

The preferred embodiments described herein relate to alternating currents produced by medium-frequency resonant power supplies in which the term "medium frequency" is understood to refer to frequencies above that of the supply mains which is 50 to 60 Hz in most countries, and under 1 MHz. The preferred embodiments have an operating frequency of 25 KHz and 10 KHz, though circumstances may arise, such as new applications for the power supply of this invention, new environmental constraints, or the availability of improved components, which may either direct or encourage other frequencies to be preferred.

The resonant power supply may be considered as an inductor and a capacitor connected to form a closed loop, within which relatively large currents of resonating electricity may flow; being alternately stored temporarily as electrostatic and as magnetic energy. The resonant inductor itself is employed in most aspects of this invention as a source of cyclically changing magnetic energy; for which the resonant power supply has the advantages of a relatively strong field, and providing a relatively constant rate of change of flux—that is, the resonating electric current closely approximates a sine wave. The advantages of a sine wave are that little magnetic flux is wasted in the form of unavailable harmonics or skin-effect losses if tuned secondary coils are used, and that relatively little harmonic energy is radiated when it might potentially cause interference to communications equipment. The preferred symmetrical driver configuration tends to eliminate even harmonics.

In use, the half-cycle closure of either of the switches at the correct moment—i.e. phase-sensitive switching—serves to boost the circulating current by causing supply current to pass through either side of the coil, rather like pushing a child on a swing. Clearly the switches will short out the circulating current if both are turned ON at the same time. Control of the amplitude of resonance may be carried out by limiting the duty cycle of the switching devices, but preferably each is arranged so as to switch on or off only when the voltage across it is zero, to avoid harmonic radiation. Preferably control of the resonant current is achieved by varying the input power supplied to the circuit—as by current limiting or voltage control—while retaining half-cycle energisation of the switching devices.

A decoupling inductance is provided between the centre-tapped inductor across (or forming part of) the resonant circuit, in order to provide a current source and allow the voltage across the resonant circuit to be free to oscillate without restraint.

A variety of switching devices are suitable for use in the invention. FIG. 1a indicates the devices as conventional switches; however solid-state switches (or other active devices such as vacuum tubes) are preferred in order to cope with the speed of operation. FIG. 1b shows bipolar transistors, FIG. 1c, adapted for an AC supply rather than a unidirectional one, shows Triac devices, and FIG. 1d shows the preferred IGBT power transistors. FIG. 1e shows power MOSFET transistors. The choice of a suitable switching device is based on current and voltage ratings, in particular the peak forward voltage rating required is at least pi (3.142) times the DC (or peak AC supply) voltage, together with switching speed requirements and whether or not a bidirectional (AC-capable) switch is required. Reverse protective diodes are not shown in FIG. 1, but are shown in FIG. 10 (as 1200 V avalanche diodes).

Fine control of the operating frequency of such a circuit, should this be required, may be provided by circuits such as those of FIGS. 1e or 1f. In FIG. 1e which may be regarded as the central part of any of FIGS. 1a to 1d, a range of paired capacitors C10 and C10', C11 and C11', C12 and C12', preferably having capacity values in a binary or similar series, may be connected or disconnected by causing the associated semiconductor switch or switches to become conductive. This control method is amenable to automatic, real-time trimming.

Alternatively, as shown in FIG. 1f which is a reproduction of the top section of FIG. 1d, the inductance may be trimmed, particularly applicable to the case of an installation for distributing inductive power from a resonant circuit 11f around a defined path or route. Once the radiating wire 10f is in place its inductance may be brought up to a design value by placing ferrite toroids about it during a commissioning process; each toroid (102) placed around the preferred Litz wire conductor 101 corresponding to about a meter of Litz wire in terms of inductance. The air gap 102a is found preferable to limit permeability. Preferably the toroids are added symmetrically about each conductor close to the power supply as indicated at 103, 103' where they incidentally provide some protection to the power supply against induced transients. A fairly precise frequency of generation is preferred in installations where secondary pickup windings may be tuned to comply with a system-wide central frequency for maximised current transfer.

The use of a resonant circuit to supply medium-frequency power for inductive heating minimises the generation of electromagnetic interference, because the harmonic content of the output is small.

EMBODIMENT 1. INDUCTION HOB

Figure 11:
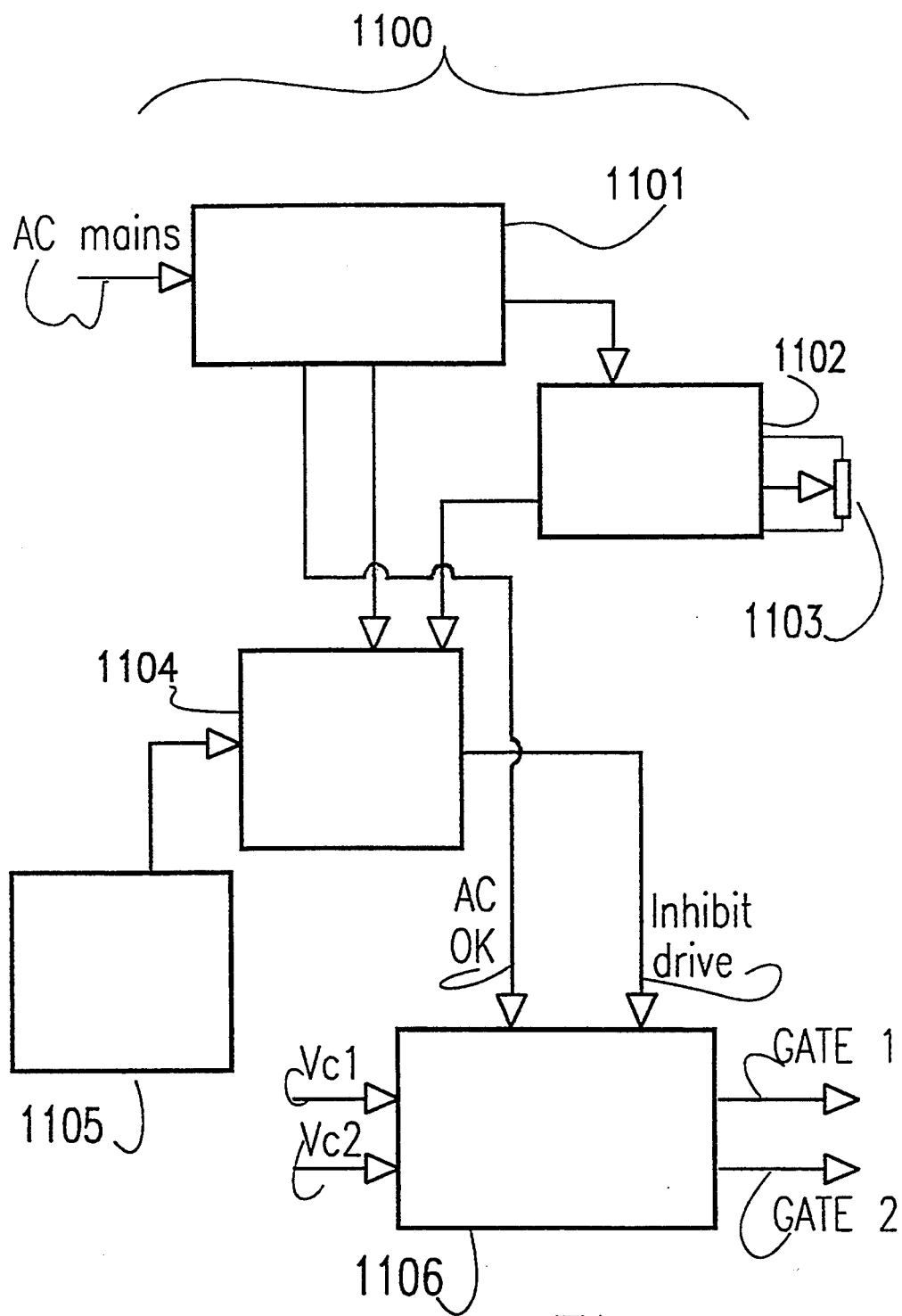
Figure 11A:
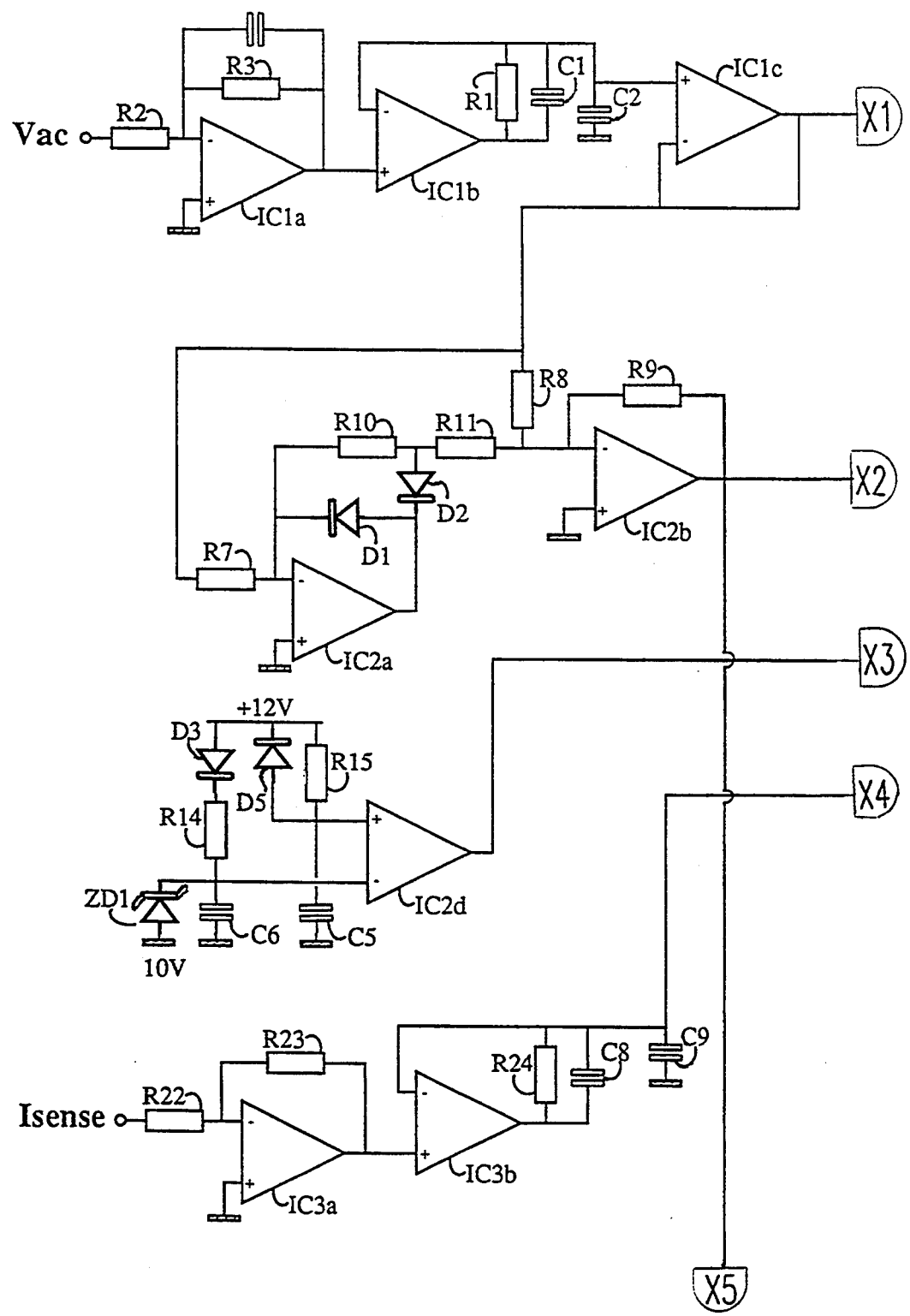

The power supply in this example, the circuit diagram of which is illustrated in summary in FIG. 1a to 1c and in more detail in FIGS. 10, 11, and 11a..11e, comprises a 25 KHz unit capable of providing about 2 Kw of power for induction heating purposes. The controller of FIG. 10 is shown in detail in FIG. 11. This power is emitted as a changing magnetic field from a spiral coil of coated copper braid placed beneath a non-conducting surface on top of a cooker, hob, or stove. When in use, it provides an almost instantaneously alterable heat, quite unlike the thermal lag of a conventional resistive electric element—more like a gas cooker but without the spillover of heat from the gas flame.

FIG. 1a illustrates the circuit diagram in principle, as it would be used for inductive heating for a container of food as on a hob. In this FIG., 10a represents the transfer coil (preferably wound as shown in FIG. 6 from coated or insulated copper braid in the form of a planar spiral) preferably located immediately beneath the hob, and used to transfer energy into the material of the conductive food container 61 of FIG. 6. Food containers are preferably made of iron or stainless steel, rather than copper or aluminium. The temperature of the food or other material within the container is raised by means of heat caused by eddy currents (copper or aluminium) and hysteretic losses, etc (ferromagnetic materials) induced within the walls and in particular the floor of the food container. As no secondary resonance is involved, the precise frequency in use need not be fixed.

In this circuit, the radiation of the magnetic flux from the resonant inductor 10a comprises the output of this power supply. The resonant current in the inductor also passes through the resonant capacitor 13a, conveniently comprised of several individual capacitors preferably capable of both minimising and withstanding any temperature rise attendant on the levels of resonant current.

The energy transferred into space or into a secondary load is supplied by power from the power source 15a, alternately connected to one end or the other of the resonant circuit by active switches indicated as 18a and 18a'. A controller 19a senses the phase (as zero-crossings) and amplitude of the circulating resonant current and turns on one or other of the switches for half-cycle periods in order to boost the current. In normal use either both switches are off, as when the resonant current is sufficient, or each switch is turned on in phase with the resonant current at its active pole and in a complementary manner to the control of the other switch. Thus current flows through the closed switch (either 18a or 18a') and through one half of the resonant circuit to return to the power supply 15a. Preferably the switches are not simultaneously on as this would cause the resonant current to be dumped through them in a possibly catastrophic manner.

Variants of this embodiment of the invention include: In FIG. 1b the provision of a second, phase-splitting transformer 14 to act as an isolation device for the resonating current yet permit the distribution of supply current from the power supply 15b through a decoupling inductor to either side of the resonant circuit. Preferably the power supply is a constant current power supply. This is achieved by providing a DC power supply 15b and a recoupling inductor 12b. Similar decoupling inductors (12c, 12d) are shown in FIGS. 1c and 1d, and can also be provided in FIG. 1a. Alternatively other means of providing a substantially constant current power supply could be used.

The use of a phase splitting transformer (14, 14d) is preferred, as the correct position for the centre tap of inductor 10a (of FIG. 1a) will be somewhat dependent on the size and placement of a cooking vessel placed on it. If the tap is not electrically centered the loads on the switching devices, and perhaps even the amount of resonating current finding its way into the mains supply, will vary. Alternatively one may use a device not requiring a direct-current supply, as illustrated in FIG. 1c, where the switch devices 18c, 18c' are (for example) bilateral silicon-controlled rectifiers or Triacs.

In all cases low-pass filtering is advantageous to prevent currents of the resonant frequency from entering the general mains supply. Filtering is shown in FIG. 10. The decoupling inductor assists in blocking resonant currents from entering the supply.

The physical construction of an inductive heating hob or 'element' is preferably designed to fit within a similar space to that occupied by a conventional, resistively dissipative heating element. The resonant power supply is relatively compact, needs no cooling fans, and the controller 19a or 19b or 19c may be located remotely. The actual radiating coil is preferably composed of a spiral of copper braid lying in a plane beneath a surface of material such as hardened glass, and preferably ferrite strips or a layer of ferrite are used as a kind of core to restrict the magnetic field to the zone above the spiral.

As for conventional cookers, an external control such as a potentiometer (the Power Control of FIGS. 11, 11a..11e) may be used to set the average rate of delivery of power. Optionally, feedback sensors such as the Utensil Detector of FIG. 11, and 11c may be used to detect the absence of the vessel or the state of temperature of the vessel. Other sensors, such as examples heat sensors (such as thermistor pairs) may be used, or an acoustic sensor might be used to detect the onset or intensity of boiling. A microswitch sensitive to weights placed on the cooking surface is advantageous to prevent emission in the absence of a cooking vessel. The preferred Utensil Sensor of FIG. 11c is a current threshold monitor, for sensing whether something is absorbing the radiated magnetic flux.

Cooking vessels have been constructed which are comprised of a cast iron or stainless steel material coated on the outside with a tough decorative ceramic material. This does not require the long handles of conventional saucepans, since there is very little stray heat that otherwise requires thermal insulation by displacement from heat or by elongation from the source.

FIG. 6 shall be described here because it relates to FIG. 1a..c and FIG. 10. It is an illustration of an inductively energised hob 60, in which 61 represents a cooking vessel, with one minimal handle 62 shown. 63 is a support layer of non-conductive material, preferably composed of toughened glass, and preferably bearing a decorative pattern which helps to define the energised area to the user. 64 is a planar spiral of insulated braid, which delivers the electrical energy. Connectors 65 are also shown, although a centre tap (as for the configuration of FIG. 1a) is not shown. On a baseplate 66, there are preferably four ferrite strips 67 to interact with the magnetic field and by channeling the downward flux through themselves force it to radiate substantially upwards, not downwards amongst the material of the cooker or stove. Optionally this material may be a sheet of a ferrite or another material having suitably low losses at the operating frequency. Spacers and supports are not included in this exploded view.

Referring again to FIGS. 1a to 1d, the electrical energy generated is a substantially pure sine wave of alternating current, being that current flowing within the parallel resonant or tank circuit formed by the capacitor 13, and the coils 10 and 14, here shown connected in parallel. The purity of the sine wave is dependent on the loading, in effect, the Q of the resonant circuit. The third harmonic of the alternating current has in the embodiment shown in FIG. 10 been reduced to approximately 5% of the amplitude of the fundamental, and the fifth harmonic is approximately 2%, under typical conditions of load wherein the resulting Q of the LC circuit is 3.

The coil 14 or 14d is known as a phase-splitting transformer. It is preferably wound on a ferromagnetic core, and has a centre tapping to carry the supply current. An advantage of the addition of this second, three-terminal inductor to the resonant power supply is that only a small fraction of the resonating current passes through this inductor and therefore it need not be large. There are a number of applications wherein it is inconvenient to provide a centre-tap to the resonant inductor itself, such as when it forms an elongated loop possibly hundreds of meters long for power distribution purposes, or when asymmetry of load occurs in inductive heating applications. As indicated in FIG. 10, the supply current to L101 is passed through a decoupling choke L102 from an unsmoothed DC supply constituted in this preferred embodiment by the bridge rectifier BR101. L102 renders the power source a current source rather than a voltage source. The rectifier may be fed with direct mains electricity, or power may be transformed by any means to a lower or higher voltage. The DC supply may be smoothed but preferably (for reasons of economy and more particularly so that the input power factor of the functional resonant power supply is close to 1) is substantially unsmoothed and unregulated.

The pair of active switching devices used in the resonant power supply of FIG. 10 are preferably semiconductor switches—Q101, and Q102. They are drawn here as power metal-oxide-silicon field effect transistors or MOSFETs, but may be the preferred IGBT (insulated gate bipolar transistor), or alternatively GTO (gate turn-off) thyristors, or any other suitable semiconductor switch. An indication of the range of possibilities is suggested also in FIG. 1. Some IGBT devices provide a quite economical type of switch in this design. The switch devices are caused to switch the current alternately through one leg of the resonant tank circuit, then the other, by gate signals derived from the control module beneath—as shown in FIG. 10. Circuit details of the controller are given as a block diagram in FIG. 11 and in detail in FIGS. 11a–11e. The semiconductor switches are preferably operated fully on or fully off, without intermediate partly conducting states. The control pulses are preferably generated with a fixed duty cycle of 50% of the cycle of the resonating secondary current in order to minimise the generation of harmonics.

Should the output drivers be inhibited—as a means of current limiting or as a means of output control, then neither semiconductor switch is turned ON. If both switches were to be ON simultaneously the resonating current would pass through them both.

In a variant of this configuration, pairs of additional switches are connected in parallel with the main switching devices; each switch of each additional pair having a matched trimming capacitor, small in comparison with the resonant capacitor, in series. Each pair of additional switches may be held on an ON state in order to connect extra capacitance to the LC circuit and thereby to provide a means to adjust the frequency.

Reverse diodes D101, D102 are placed across the semiconductor switches for protection against transients. These may be integrated within the switch for some types of switch. In this embodiment they are 1200 V avalanche diodes The resonant controller 19a, 19b, 19c of FIG. 1 which provides control pulses at the resonant frequency preferably derives synchronising signals from each of the links between the resonant coil and the controlling semiconductors. Preferably the controller is able to sense the load of a cooking vessel or the like placed in proximity to the coil, and can substantially inhibit output if no vessel is near. Preferably it is able to provide a proportional control of the heat by inhibiting the gate control pulses for randomly selected half-cycles of the AC mains at a controlled but aperiodic rate of recurrence. A timing clock of the type commonly used on stoves or cookers to predetermine the onset and duration of the cooking period may also be provided. Optionally, thermal sensing of the food temperature for the purposes of closed-loop regulation of temperature may be provided for. Alternatively, detection of the vibratory agitation caused by boiling may be a regulating input.

Figure 11B:
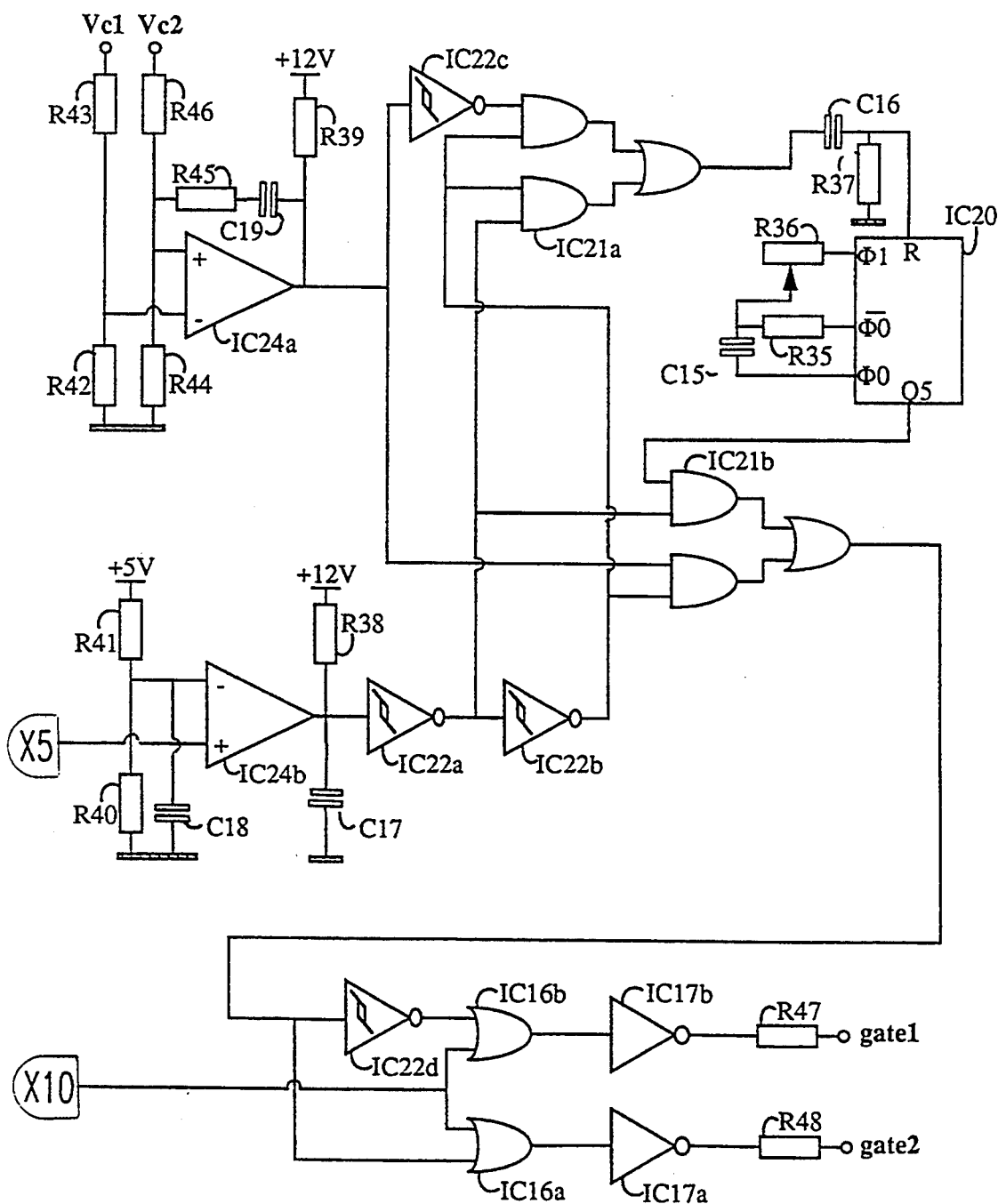
Figure 11C:
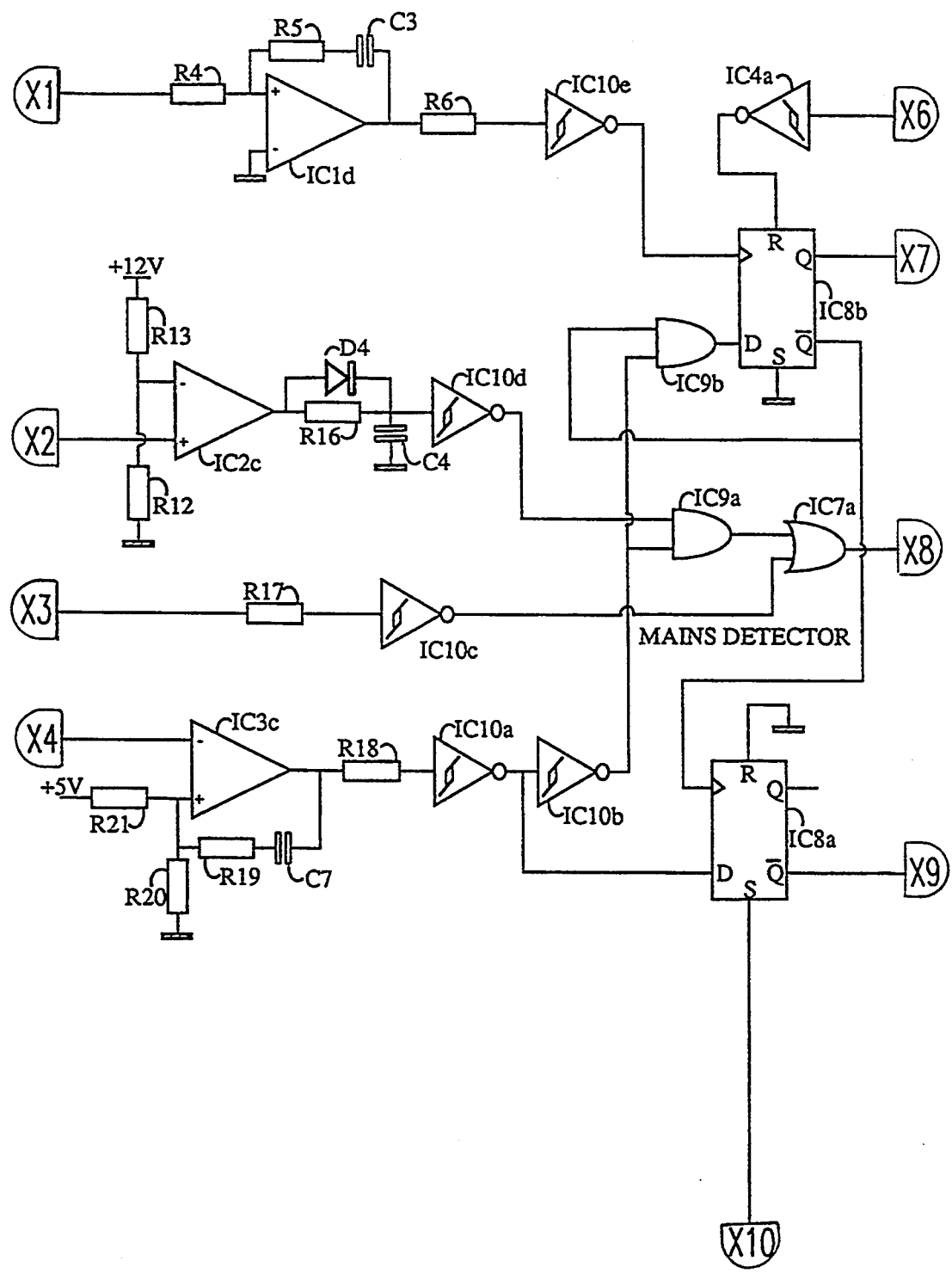
Figure 11D:
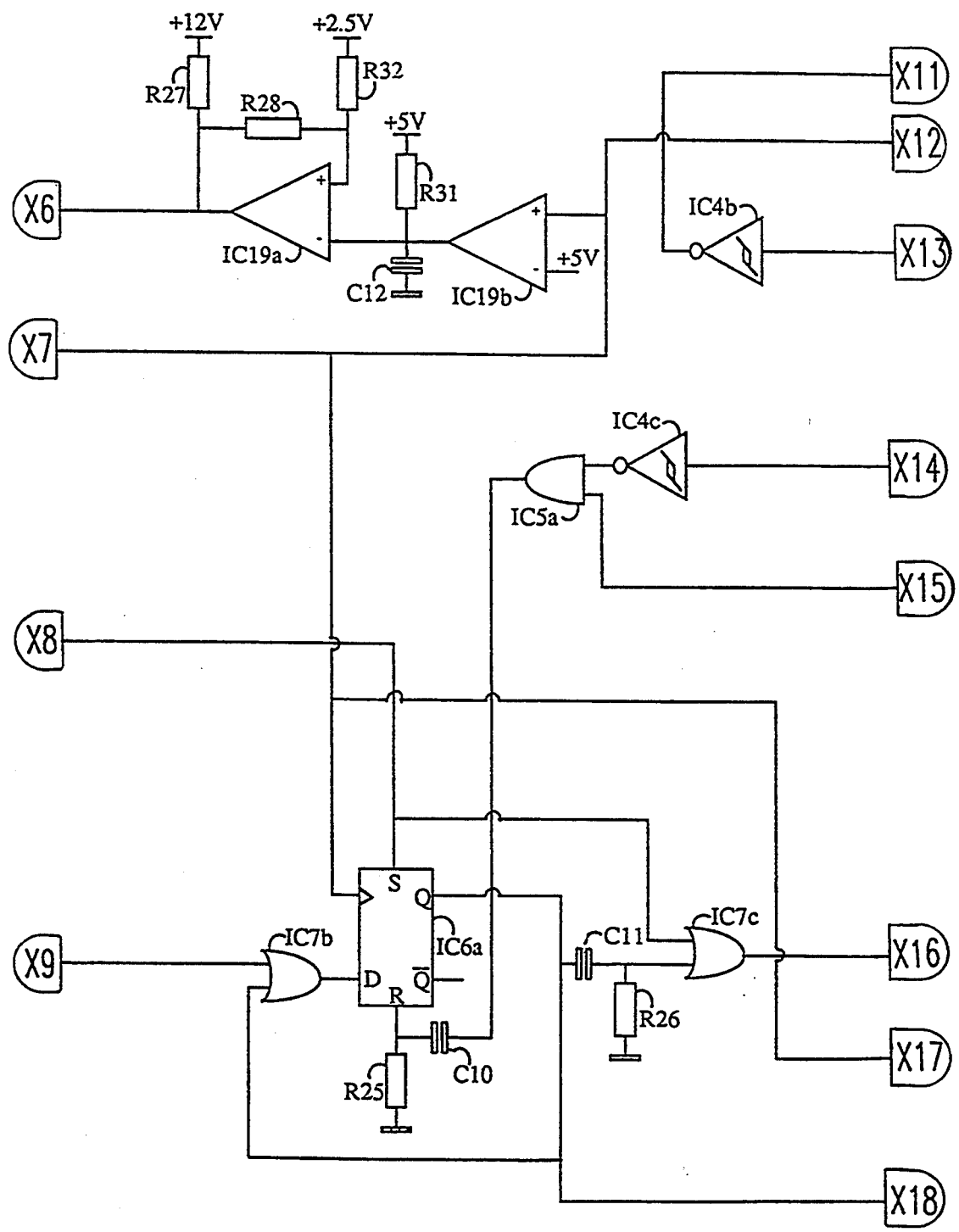

FIGS. 10, 11a, and 11b describe a further embodiment of the induction cooker or hob.

FIG. 10 illustrates the entire hob circuit, although the controller, which is detailed in FIGS. 11a to 11e, is shown as a block. The AC mains input is at the left, and the spiral element coil is at the right. The mains voltage is passed through a bridge rectifier BR101 and the absence of a filtering capacitor provides a power factor of close to 1. The 1 $\mu$F capacitor C101 minimises radiated interference, the inductor L102 converts the voltage-controlled power supply into a current source, and the resistor R101 is a bleeder. Unsmoothed DC is applied to the centre tap of inductor L101 and is returned to the supply though a 0.1 ohm current-sensing resistor R102. The preferred semiconductor switches Q101 and Q92 are 1400 V, 12 A insulated gate bipolar transistors (IGBTs). The resonant circuit is formed from inductance L100 and capacitance C102 (0.17 $\mu$F) Avalanche diodes (1200 V rating (D101 and D 102)) along with capacitors C103 and C104 are provided to bypass reverse transients.

FIG. 11 illustrates a preferred controller for the induction heater embodiment of the power supply. (FIGS. 11a to e illustrate the details of the circuit). In FIG. 11, 1100 refers to the entire controller. The AC mains is supplied as a signal to block 1101, which senses the presence of the signal, conditions (i.e. filters) the signal, detects the moments at which the input mains is at zero, and supplies signals to other modules. Module 1102, the aperiodic power control, receives mains-related pulses as one input, and the setting on a user control, 1103 (here shown as a potentiometer) as another input. This module generates a signal used to cause randomised interruptions to the alternating signals fed to the transistor drivers, so that the user's desired heat setting is translated into a proportional amount of "on" time versus "off" time. A further input module is a current-sensing module 1105, which tests the supply current to the resonant circuit for fault conditions and particularly for current levels which indicate the presence or absence of a suitable type of cooking container. It creates inhibit signals if a cooking vessel is absent, or if the current drain is too high. These inhibit signals and those from module 1102 are fed to module 1104, which serves to link the inhibit signals with the zero-crossing moments of the AC mains supply, so that inhibition acts only over integer cycles of the input mains voltage. Module 1106 receives "AC OK", and "Inhibit drive" signals from other modules, and also samples the voltages at each side of the resonant circuit from positions adjacent to the collectors of the preferred IGBT transistors. This module contains an artificial-pulse generator in case no natural resonant current is present, and also means to use sensed natural resonant current to synchronise the complementary outputs to Gate 1 and Gate 2 if available, and inhibition is not active. Should inhibition be active, neither GATE 1 nor GATE 2 is sent a drive pulse.

FIGS. 11a to 11e are the parts of a single circuit, with connections between drawings at numerals such as X1 or X7. This circuit is, of course, only one possible implementation of the functions preferred for this hob application. It could be replaced with other circuits providing similar functions or more preferably a microprocessor and a small number of ancillary components, for the sake of economy.

Figure 11E:
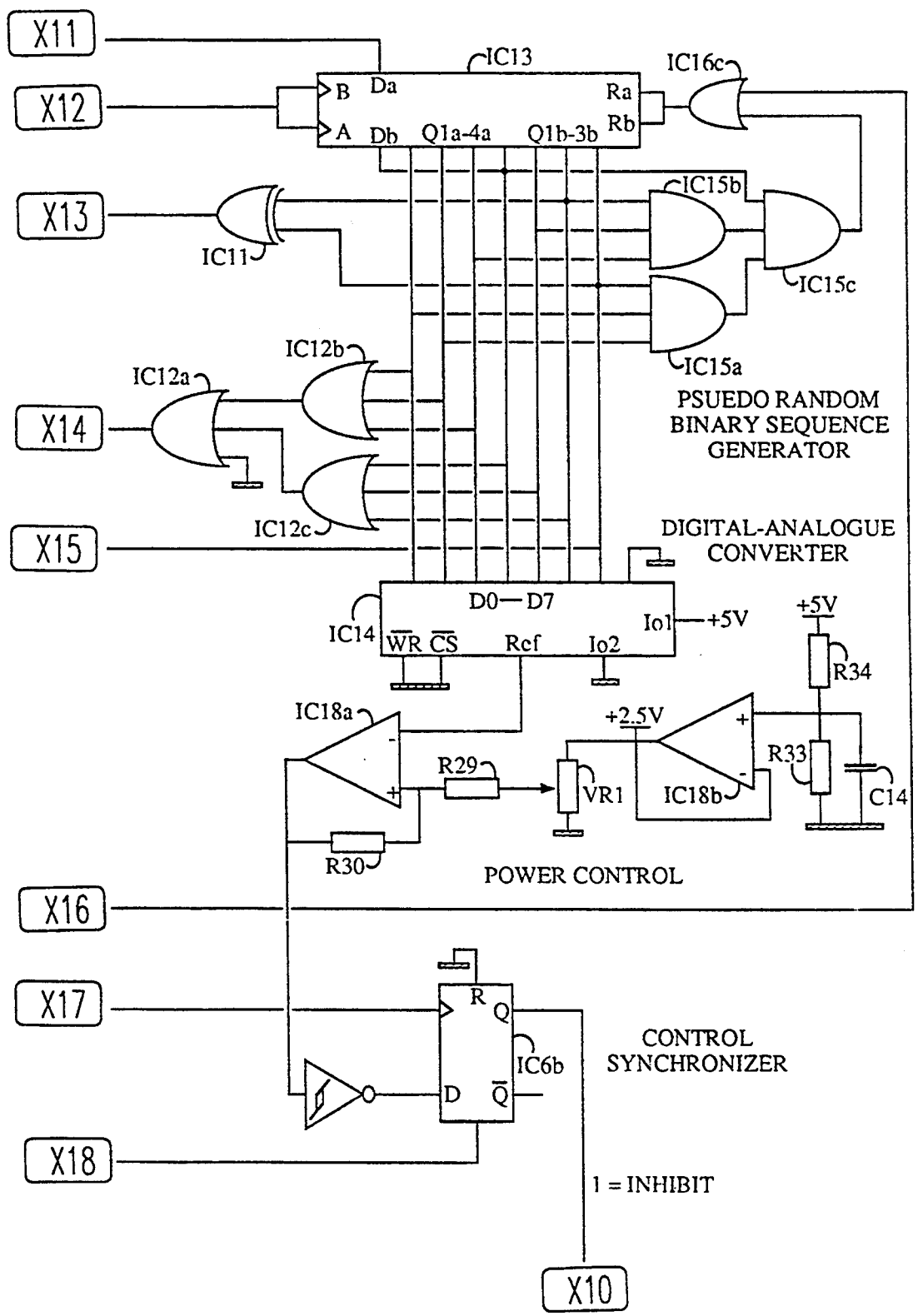

The circuit provides complementary gate drive—which may be inhibited—to the two semiconductors Q101 and Q102 of FIG. 10 from the lower right of FIG. 11b. To determine the correct timing of pulses it preferably accepts:

user heat setting demand—VR1 just below the centre of FIG. 11e,
present cycle phase angle—inputs Vc1 and Vc2 at the top left of FIG. 11b (these signals being the collector voltages of the switch devices Q101 and Q102 of FIG. 10),
current sense—input Isense at lower left of FIG. 11a,
AC line voltage status—imported as Vac at top left of FIG. 11a,
utensil detector—detected in terms of current drawn Isense and compared against a reference voltage at lower left of FIG. 11c.

The particular aspects of this circuit are:

Vac (mains) input and conditioning is required so that the device can interrupt consumption by inhibiting IGBT gate drive for even numbers of half-cycles of the mains (to avoid DC loads) in an aperiodic or pseudo-random manner (to avoid repetitive flicker of lights or other adverse effects on other mains-driven equipment, and therefore a mains zero-crossing detector IC1d, IC10e at top of FIG. 11c is supplied with a low-pass filtered version of the input mains via IC1a, IC1b, and IC1c.

There is also a mains presence detector, which is fed with a rectified mains signal (from IC2a, IC2b in FIG. 11a, and which compares that signal against a reference in FIG. 11c, in operational amplifiers IC2c and IC10d (the latter is a Schmitt trigger to render the analogue signal a clean digital version.

All analogue controlling inputs are synchronised with the supply AC mains in the flipflop, IC8b at top right of FIG. 11c, so that inhibition of the IGBT drivers acts only at zero crossings of the input mains.

The user-accessible power control at the centre of FIG. 11e causes the IGBT drivers to be inhibited in an aperiodic way, with an average "duty cycle" corresponding to the fraction of full power required for the task. The pseudo-random binary sequence generator in the top half of FIG. 11e is a hardware generator of aperiodic inhibition pulses. It comprises a binary counter, IC13, linked to a digital-to-analogue converter (DAC) IC14. The DAC output, which rises at a random rate according to the logic gates IC11, IC12, and IC15, is compared with the analogue controlled voltage within IC18a, and the result of the comparison is synchronised with the mains in the control synchroniser IC6b (a flipflop), and used to inhibit the IGBT gates through the control line X10.

To initiate resonant current flow, in the absence of existing current to be reinforced, a startup clock is provided within the Force Clock at top right of FIG. 11b. This circuit develops pulses at approximately the resonant frequency of the hob; while IC24b, IC22a, and IC22b sense adequacy of the natural resonant input and cause a changeover.

This artificial start may happen at each half-cycle of the mains if the supply current is unsmoothed.

IGBT drivers (lower part of FIG. 11b), IC17 is preferably the ICL7667 integrated circuit, manufactured particularly for rapidly driving capacitative loads.

EMBODIMENT 2. INDUCTIVELY TRANSFERRED POWER FOR MOVING VEHICLES

This embodiment is capable of energising the conductors in a track which supplies motive power to moving vehicles along it by inductive means. It provides for the production of substantial medium-frequency AC power of low harmonic content, yet presents the AC mains power supply with a power factor substantially equal to 1. The medium-frequency AC is radiated from a conductor and collected by a pickup coil situated within or under each moving vehicle.

FIG. 2 (overall) with FIGS. 3, 4, and 5 (controller details) illustrate refinements to the circuit of FIG. 1. The entire power supply includes both a boost converter and a buck converter to allow control over the DC power supplied to the resonant converter. The boost converter output is a high voltage, of preferably at least 400 V, so that the AC mains input of nominally 230 V can be presented with a power factor of substantially 1.0. Other mains voltages suit correspondingly different bus voltages. The buck converter reduces this high bus voltage to preferably 160 V, largely because of the voltage limitations of the preferred transistors in the resonant converter which have $\pi \times V^{in}$ applied across them. The buck stage also provides the preferred property of current limiting, which is relatively difficult to provide within the boost stage.

Referring to FIG. 2, at top left the AC mains supply is conventionally introduced via a transient suppressor MOV201 and capacitor C201 to a single-phase bridge rectifier BR1. (Larger systems may use three phase configurations). The raw DC from the rectifier moves towards a converter stage, (Boost controller—see FIG.

3—plus associated elements; Q201, Q202, L201, L202, D201, C202-C205) and then through interconnection points Z1 and Z2 to a buck converter stage (Buck controller—see FIG. 4—plus Q203, L203, D202, R204, C206 and C207).

It is possible to control the power level within the distributed conductors by means of the buck controller circuit, and also to provide protective current limiting functions. For current limiting, R202 and R204 act as current sensors.

Finally the DC supply is supplied to the resonant converter, in the lower part of the illustration. The resonant converter consists of the resonant controller (see FIG. 5), and components T201 primary and C208 (the resonant circuit), Q204 and Q205, and L204 to the primary centre tap. T201 may be considered as the site wherein the magnetic energy developed by the resonant power supply is produced and used. The secondary of T201 is in fact a preferably small number of turns of preferably thick wire and is brought to out to connectors as a low-voltage, medium-frequency sine wave of perhaps one or two Kw—in the embodiment. In other embodiments the primary inductance of T201 is in fact the wire laid along the track or route for the moving vehicles. However there are instances wherein it is desirable to have an electrically isolated supply distributed through an area, and here transformer isolation is preferred.

An energy converter for a inductive loop powered vehicle system would take the output if this power supply and connect it to the energised conductors of the tracks, which for safety reasons as well as operating considerations preferably carry low-voltage, high-current, medium-frequency AC.

This is an electrically isolated output, highly preferable for applications in which the power-carrying conductors are laid throughout a working space. The resonant design has the advantages of providing minimal switching losses, even though the semiconductor devices are driven as pure switches without partially conductive modes to produce a sine wave output. The sine wave output is desirable as harmonics of a substantial power level may well be sufficient to cause the emanation of electromagnetic interference in the radio spectrum. The operating frequency can be higher than that of a conventional switched-mode power supply, because there are lower switching losses: there is less radio-frequency interference, and no leakage inductance problem; however transformer conduction losses tend to be higher unless low-loss wire is used. The efficiency of inductive power transfer is improved with higher frequencies.

FIG. 3 illustrates the detailed circuitry of the boost DC-DC converter controller, which converts a raw 300 V AC peak waveform (nominal; for 230 V mains input) to approximately 400 V, working at up to around 3 amperes, and provides a power factor of 1 at the input; desirable to preserve the waveform of the mains supply for other consumers.

Inputs to the controller are: Power (Vdc+) at top left, (Vdc+ is the block output, for sense purposes), Vrect, (at top right) and Isense, under the centre); all referred to ground. Outputs are: a gate control, (fight centre) intermittently energised according to the results of proportional control calculations, for the switching device Q201, and a second gate (lower fight edge) for a soft-start device Q202.

Starting at the top left, Vdc+ is divided through a resistor chain and buffered by a quarter LM324, IC3-01a). The signal moves to the fight for shaping and time-dependent alteration and is taken through a summing point to the quarter LM339 (IC302d) at fight of centre, which is an oscillator. The frequency or duty cycle of the pulses generated herein depend on Vdc+, and are passed through the ICL7667 buffer (IC303a) to the control device gate.

The signal train passing down the left side is concerned mainly with starting the system, providing a soft-start drive to control device Q202. IC302b amplifies a signal fed to a time-dependent comparator IC302c which drives a half ICL7667, IC303b which drives the transistor Q202 at "Soft" via a current-limiting resistor.

FIG. 4 illustrates the circuitry of the buck DC-DC converter controller. The purposes of this circuit include to reduce the voltage of the boost converter's output and also to provide current limiting.

The inputs are: VDC+ and VDC− (at top left), ground, and Isense (both at centre left and just a little above and to the fight of centre. One gate control output is provided, to Q203, at right centre, and a soft-start control output is also provided at bottom centre. This last is not used, if a boost controller, also having a soft-start feature, is installed.

Within the circuit there are several signal paths, beginning at the top left with the LM324 (IC401a) as a difference amplifier, and converging on the two LM339 (IC402a, IC402d) devices below centre, which oscillate and create drive pulses, amplified by the ICL7667 buffer (IC403a), for application to the gate of the control device Q203.

FIG. 5 illustrates the detailed circuitry of the resonant converter controller. (This is a simpler embodiment than that shown in FIG. 11; for example this one lacks means to cause both switches to be off, because power control is instead provided by the buck/boost controller stages in FIGS. 3 and 4.) The purposes of this circuit are to provide complementary drive pulses to the two semiconductor switches Q204 and Q205 that alternately drive the resonant circuit substantially at its resonant frequency. VC1 and VC2 at top left are the inputs, taken from each device collector. A half LM319 comparator (IC501) converts them into a pulse at the resonant frequency; this is passed through logic circuits which select either the natural clock from IC501 or an artificial pulse train to be fed to the pair of driver devices (IC504) type ICL 7667, which drive the transistors Q204 and Q205 from outputs at bottom right. One driver is preceded by a Schmitt inverter (part of IC505), type 40106, so that complementary pulses are always produced. The other half (IC502) of the LM319 provides a startup function; comparing a fraction of Vdc with a reference voltage and changing state when Vdc is high enough to set a first state within the logic circuit. This, via logic elements of IC505 (a 40106) and IC506 (a 4019) inhibits the clock device at top right of FIG. 5—IC503 (a 4060) which may generate a drive train of pulses prior to the onset of detectable resonating currents in T201-C208.

FIG. 6 has been described with reference to Embodiment 1—the inductive hob.

EMBODIMENT 3. INDUCTIVELY TRANSFERRED POWER FOR MOVING VEHICLES

This embodiment resembles the previous example but incorporates preferred means to 30 efficiently apply power to a significantly longer track. This track presents a higher inductance and hence requires a higher voltage to produce the required current. The overall arrangement of the embodiment is shown schematically in FIG. 7, in which the transformer T71 at the left provides electrical isolation for power converters and ultimately the tracks, the power semiconductor switches are shown as Q71 and Q72, and the resonant circuit is composed of the centre-tapped inductor 171 and the capacitor C71. The actual track is indicated as the two inductances 172 and I73 and it will be noted that there is no capacitor at the remote end in this particular embodiment, and that the tracks are connected directly to the each end of inductor I71 rather than from a separate, isolated secondary winding. In one example this approach gave an RMS voltage of about 440 V. In other respects the system in FIG. 7 is comparable to that of the first embodiment of this inductive power supply as described above.

EMBODIMENT 4. PICKUP COILS FOR MOVING VEHICLES

It has been found preferable to employ a ferromagnetic material, preferably a ferrite, to improve coupling and the pickup of energy from the primary conductors. One preferred embodiment has constructed by taking a number (say 20) of 'E'-shaped ferrite blocks and cutting off the two outer limbs, thereby making 'T' sections, and using these in pairs joined at the base in the shape of the letter 'I'. An example pickup coil made in this way is 240 mm long, 50 mm wide, and preferably has the primary conductors placed symmetrically on each side of the body of the 'T'.

FIG. 8 illustrates a section through another, preferred, pickup coil, in which 81 and 81' represent the outward and return track conductors (i.e. primary windings), mounted within cable ducting on standoffs from the fixed track 86. 82 is the ferrite core of the secondary coil, mounted with a bolt 85 and nut 85' onto the mobile vehicle whose base is indicated by 88.84 and 84' are the outward and return profiles through the windings of the secondary coil. All conductors are preferably of Litz wire. Preferably the number of turns is such that the self-inductance of the coil is set in accordance with the formula for optimum inductance:

$$L = \frac{R'MI}{V^c}$$

where $I$ = rms track current
$R'$ = load resistance reflected across tuned coil capacitor
$V^c$ = rms output voltage across load
$M$ = mutual inductance between coil and track.

No additional inductance is required to tune the pickup coil when this formula is used.

FIG. 9 illustrates two versions of the pickup coils incorporating preferred means for detuning the secondary or pickup coil away from a state of resonance in the event of too great a voltage being recovered. One disadvantage of too great a resonance is that current is bled from the track and away from other trolleys which preferably share the supply current. This preferred embodiment may be used in conjunction with any medium-frequency power supply and inductive track layout embodiment.

In FIG. 9a, semiconductor switch Q90 is located across a bridge arrangement of diodes BR90, which rectify the resonating current for use by a load device. The also steer current through Q90 in only one direction. The comparator O90 samples the output voltage from the resonant circuit comprising the pickup coil L90 and C90, after rectification by the bridge rectifier BR90 and filtering by capacitor C90a. Should the output voltage (actually a fraction of it, as determined by the voltage divider chain) be raised above a reference level $V_{oref}$ as applied to the comparator O90, the switch Q90 is turned ON thereby shorting the resonating current. The output voltage $V_o$ is thereby reduced. Hysteresis is provided through the use of R90h and a relatively slow cycling rate between open and shorted states of preferably over 100 mS is thereby provided. This process is repeated more frequently if the load is light. It has the preferred effect of decoupling the secondary coil from the track; otherwise a high circulating resonant current consequent to a lightly loaded secondary device would substantially impede the transfer of power to other consumers further along the track. Diode D90 prevents stored charge and the like from also passing through the semiconductor Q90, which is preferably a power MOSFET transistor.

FIG. 9b shows an alternative, in which a second secondary coil is shorted, thereby decoupling the main secondary coil. In FIG. 9b, semiconductor switch Q92 is located across a bridge arrangement of diodes BR92, which serve to steer current through Q91 in only one direction. The comparator 092 samples the voltage from the main pickup coils L91, after rectification by the bridge rectifier BR91 and filtering by capacitor C91a. Should it be raised above a reference level $V_{oref}$ the switch Q92 is turned ON and the second or auxiliary inductor, L92 which is wound on the ferrite former together with inductor L91 becomes shorted. This shorting action by switch Q91 prevents flux from cutting coil L91 and hence prevents the transfer of power to it. The output voltage $V_o$ is thereby reduced, and the effect of circulating currents on the primary track is substantially reduced.

Finally, it will be appreciated that many other configurations of this resonant electrical energy converter or resonant power supply and related applications will be evident to one skilled in the art; however such variations remain within the spirit of this invention. For example, we have not disclosed an embodiment having power ratings suitable for energising a fluorescent lamp, and we have not disclosed an embodiment particularly capable of energising a rail storage system with many kilowatts of electric motor load in existence. We have not disclosed embodiments reaching high or low frequency ratings, but we consider that 400 Hz embodiments are (for example) are quite practicable. We have not tested all the known variations of semiconductor switch, for which improved versions are continually coming on sale.

We claim:

1. A resonant power supply suitable for generating a periodically varying magnetic field comprising:

a first two-terminal inductive unit, and a two-terminal capacitative unit each terminal of which is connected to a corresponding terminal of said first inductive unit, thereby comprising an electrically resonant circuit having a natural resonant frequency, means to convert a first supply of electricity into a second supply of electricity substantially at a constant current, said means including a source of said second supply of electricity and a second two-terminal inductive unit in series with the source, the source and the second inductive unit having a pair of output terminals, a three-terminal inductive unit having two outer terminals and a center-tapped terminal, presenting a relatively high reactance at the resonant frequency so that in use substantially none of the resonating current flows through it, each outer terminal being connected to a corresponding terminal of the resonant circuit, while the center tapped terminal is connected to one of said output terminals, a pair of controllable switching devices, each capable of a closed state or an open state, each switching device being connected between a corresponding terminal of the resonant circuit and the other of said pair of output terminals, controlling means coupled to each of the switching devices and capable of causing each switching device to open and close alternately and in opposite phase to the state of the other switching device at a rate corresponding to an operating frequency at or near the natural resonant frequency of the resonant circuit, whereby in use the resonating current in the resonant circuit is reinforced by operation of the switching devices and the resonating current does not pass through the switching devices, and the periodically varying magnetic field is emitted from the first two terminal inductive unit.

2. A resonant power supply as claimed in claim 1, wherein means to convert the first supply of electricity into the second supply of electricity is replaced by an external supply of power in a constant-current form.

3. A resonant power supply as claimed in claim 1, wherein the controlling means is also capable of causing both switching devices to be a periodically switched off simultaneously (but not switched on simultaneously) to control the power supplied to the resonant circuit.

4. A resonant power supply as claimed in claim 3, wherein the controlling means includes or is connected with sensing means comprising a sensor responsive to zero-crossing events within the resonating electric current.

5. A resonant power supply as claimed in claim 4, in which the operating frequency is within the range of 450 Hertz to 1 Megahertz.

6. A resonant power supply as claimed in claim 3 wherein the first two terminal inductive unit comprises a long loop of conductive material adapted to form the primary of an inductive power distribution system.

7. A resonant power supply as claimed in claim 6, wherein the operating frequency is within the range of 1 Kilohertz to 100 Kilohertz.

8. A resonant power supply as claimed in claim 7, wherein the resonant frequency is caused to remain within close limits by manual or automatic trimming of the value of at least one of (a) the first two-terminal inductive unit, or (b) the two-terminal capacitative unit.

9. An induction heating cooking appliance or installation having at least one two-terminal inductive heating element supported on or in an enclosure, said inductive heating element being connected to and forming part of a resonant power supply, and said inductive heating element comprising a planar spiral of inductive material having a backing of low-loss ferromagnetic material, said resonant power supply comprising said two terminal resonant inductive heating element, and a two-terminal capacitative unit each terminal of which is connected to a corresponding terminal of said inductive heating element, thereby comprising an electrically resonant circuit having a natural resonant frequency, means to convert a first supply of electricity into a second supply of electricity substantially at a constant current, said means including a source of said second supply of electricity and a second two-terminal inductive unit in series with the source, the source and the second inductive unit having a pair of output terminals, a three-terminal inductive unit having two outer terminals and a center-tapped terminal, presenting a relatively high reactance at the resonant frequency so that in use substantially none of the resonating current flows through it, each outer terminal being connected to a corresponding terminal of the resonant circuit, while the center tapped terminal is connected to one of said output terminals, a pair of controllable switching devices, each capable of a closed state or an open state, each switching device being connected between a corresponding terminal of the resonant circuit and the other of said pair of output terminals, controlling means coupled to each of the switching devices and capable of causing each switching device to open and close alternately and in opposite phase to the state of the other switching device at a rate corresponding to an operating frequency at or near the natural resonant frequency of the resonant circuit, whereby in use the resonating current in the resonant circuit is reinforced by operation of the switching devices and the resonating current does not pass through the switching devices, and the periodically varying magnetic field is emitted from the first two terminal inductive unit.

* * * * *